(12) United States Patent
Deng et al.

(10) Patent No.: US 10,782,818 B2
(45) Date of Patent: Sep. 22, 2020

(54) LOAD CELL ARRAY FOR DETECTION OF FORCE INPUT TO AN ELECTRONIC DEVICE ENCLOSURE

(71) Applicant: Apple Inc., Cupertino, CA (US)

(72) Inventors: Andrew Deng, San Jose, CA (US); Travis N. Owens, Fremont, CA (US); Shubhaditya Majumdar, Santa Clara, CA (US); Wei Lin, Santa Clara, CA (US); Ying-da Wang, Taipei (TW); Timothy D. Koch, Santa Cruz, CA (US); Nathan K. Gupta, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/116,785

(22) Filed: Aug. 29, 2018

(65) Prior Publication Data
US 2020/0073504 A1    Mar. 5, 2020

(51) Int. Cl.
*G06F 3/041* (2006.01)
*G06F 1/16* (2006.01)

(52) U.S. Cl.
CPC .......... *G06F 3/0414* (2013.01); *G06F 1/1643* (2013.01); *G06F 1/1652* (2013.01)

(58) Field of Classification Search
CPC ..... G06F 1/1643; G06F 1/1652; G06F 3/0414
See application file for complete search history.

(56) References Cited

U.S. PATENT DOCUMENTS

| 3,543,568 A | 12/1970 | Russell |
| 3,745,502 A | 7/1973 | Watanabe |
| 3,876,912 A | 4/1975 | Sanders |
| 4,345,477 A | 8/1982 | Johnson |
| 4,423,640 A | 1/1984 | Jetter |

(Continued)

FOREIGN PATENT DOCUMENTS

| CN | 1527933 A | 9/2004 |
| CN | 1796955 | 7/2006 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Amare Mengistu
*Assistant Examiner* — Crystal Mathews
(74) *Attorney, Agent, or Firm* — Brownstein Hyatt Farber Schreck, LLP

(57) ABSTRACT

A force input sensor includes a load cell to adapt a compressive force applied to the force input sensor into a strain experienced by a strain sensor in the load cell. In particular, the load cell includes two compression plates separated from one another by a gap so as to define a volume between them. A flexible substrate (a "diaphragm")—includes a strain sensor and is disposed and supported within the volume. One of the two compression plates includes a feature (a "loading feature") that extends toward a central region of the flexible substrate. As a result of this construction, when the compression plates receive a compressive force, the loading feature induces a bending moment in the flexible substrate, thereby straining the strain sensor.

16 Claims, 14 Drawing Sheets

(56) References Cited

U.S. PATENT DOCUMENTS

| | | |
|---|---|---|
| 4,516,112 A | 5/1985 | Chen |
| 4,581,509 A * | 4/1986 | Sanford .......... H01H 35/34 200/302.1 |
| 4,634,917 A | 1/1987 | Dvorsky et al. |
| 4,695,963 A | 9/1987 | Sagisawa |
| 4,951,510 A | 8/1990 | Holm-Kennedy et al. |
| 5,481,905 A | 1/1996 | Pratt |
| 5,577,021 A | 11/1996 | Nakatani et al. |
| 5,616,846 A | 4/1997 | Kwasnik |
| 5,673,041 A | 9/1997 | Chatigny et al. |
| 5,708,460 A | 1/1998 | Young |
| 5,790,215 A | 8/1998 | Sugahara |
| 5,844,506 A | 12/1998 | Binstead |
| 5,915,285 A | 6/1999 | Sommer |
| 6,288,829 B1 | 9/2001 | Kimura |
| 6,355,891 B1 * | 3/2002 | Ikunami .......... H01H 23/006 200/315 |
| 6,369,865 B2 | 4/2002 | Hinata |
| 6,386,023 B1 | 4/2002 | Sajna et al. |
| 6,606,087 B1 | 8/2003 | Tomomatsu |
| 6,637,276 B2 | 10/2003 | Adderton et al. |
| 6,778,167 B2 | 8/2004 | Ohashi |
| 6,812,161 B2 | 11/2004 | Heremans |
| 6,973,837 B2 | 12/2005 | Barnett |
| 7,154,481 B2 | 12/2006 | Cross et al. |
| 7,176,897 B2 | 2/2007 | Roberts |
| 7,190,350 B2 | 3/2007 | Roberts |
| 7,196,694 B2 | 3/2007 | Roberts |
| 7,211,885 B2 | 5/2007 | Nordal et al. |
| 7,320,253 B2 | 1/2008 | Hanazawa et al. |
| 7,331,245 B2 | 2/2008 | Nishimura |
| 7,392,716 B2 | 7/2008 | Wilner |
| 7,441,467 B2 | 10/2008 | Bloom |
| 7,456,823 B2 | 11/2008 | Poupyrev et al. |
| 7,511,702 B2 | 3/2009 | Hotelling |
| 7,538,760 B2 | 5/2009 | Hotelling et al. |
| 7,707,894 B2 | 5/2010 | Sumigawa |
| 7,724,248 B2 | 5/2010 | Saito |
| 7,726,199 B2 | 6/2010 | Shkel et al. |
| 7,755,616 B2 | 7/2010 | Jung et al. |
| 7,800,592 B2 | 9/2010 | Kerr et al. |
| 7,812,268 B2 | 10/2010 | Ely |
| 7,821,502 B2 | 10/2010 | Hristov |
| 7,903,091 B2 | 3/2011 | Lee |
| 7,992,448 B2 | 8/2011 | Shimazu |
| 8,020,456 B2 | 9/2011 | Liu et al. |
| 8,050,876 B2 | 11/2011 | Feen et al. |
| 8,056,421 B2 | 11/2011 | Sumigawa |
| 8,072,437 B2 | 12/2011 | Miller et al. |
| 8,077,154 B2 | 12/2011 | Emig et al. |
| 8,132,468 B2 | 3/2012 | Radivojevic |
| 8,243,225 B2 | 8/2012 | Kai et al. |
| 8,266,971 B1 | 9/2012 | Jones |
| 8,305,358 B2 | 11/2012 | Klinghult et al. |
| 8,411,064 B2 | 4/2013 | Noguchi et al. |
| 8,421,483 B2 | 4/2013 | Klinghult et al. |
| 8,434,369 B2 | 5/2013 | Hou et al. |
| 8,456,430 B2 | 6/2013 | Oliver et al. |
| 8,482,545 B2 | 7/2013 | King-Smith et al. |
| 8,519,974 B2 | 8/2013 | Berggren |
| 8,531,429 B2 | 9/2013 | Chang |
| 8,605,053 B2 | 12/2013 | Murphy et al. |
| 8,640,549 B2 | 2/2014 | Inamori |
| 8,648,816 B2 | 2/2014 | Homma et al. |
| 8,669,952 B2 | 3/2014 | Hashimura et al. |
| 8,669,962 B2 | 3/2014 | Kuan |
| 8,681,122 B2 | 3/2014 | Pirogov et al. |
| 8,692,646 B2 | 4/2014 | Lee et al. |
| 8,695,433 B2 | 4/2014 | Shimazu |
| 8,711,128 B2 | 4/2014 | Small et al. |
| 8,780,060 B2 | 7/2014 | Maschmeyer et al. |
| 8,780,074 B2 | 7/2014 | Castillo et al. |
| 8,780,543 B2 | 7/2014 | Molne et al. |
| 8,870,087 B2 | 10/2014 | Coogan et al. |
| 8,878,803 B2 | 11/2014 | Kimura et al. |
| 8,952,892 B2 | 2/2015 | Chai |
| 8,982,044 B2 | 3/2015 | Katsurahira |
| 8,982,088 B2 | 3/2015 | Kung |
| 8,988,384 B2 | 3/2015 | Krah |
| 9,001,088 B2 | 4/2015 | Lee et al. |
| 9,007,333 B1 | 4/2015 | Wilson |
| 9,057,653 B2 | 4/2015 | Schediwy |
| 9,024,904 B2 | 5/2015 | Jung et al. |
| 9,024,910 B2 | 5/2015 | Stephanou et al. |
| 9,024,918 B2 | 5/2015 | Cok |
| 9,030,427 B2 | 5/2015 | Yasumatsu |
| 9,063,599 B2 | 6/2015 | Yanagi et al. |
| 9,081,460 B2 | 7/2015 | Jeong et al. |
| 9,099,971 B2 | 8/2015 | Lynn et al. |
| 9,110,532 B2 | 8/2015 | Ando et al. |
| 9,110,545 B2 | 8/2015 | Radivojevic |
| 9,112,058 B2 | 8/2015 | Bao et al. |
| 9,116,569 B2 | 8/2015 | Stacy et al. |
| 9,116,570 B2 | 8/2015 | Lee et al. |
| 9,128,547 B2 | 9/2015 | Kodani et al. |
| 9,134,826 B2 | 9/2015 | Andoh |
| 9,158,407 B2 | 10/2015 | Coulson |
| 9,182,849 B2 | 11/2015 | Huang et al. |
| 9,182,859 B2 | 11/2015 | Coulson et al. |
| 9,200,970 B2 | 12/2015 | Kodani et al. |
| 9,223,162 B2 | 12/2015 | DeForest et al. |
| 9,223,445 B2 | 12/2015 | Sleeman et al. |
| 9,246,486 B2 | 1/2016 | Yang et al. |
| 9,262,002 B2 | 2/2016 | Momeyer et al. |
| 9,262,003 B2 | 2/2016 | Kitchens |
| 9,292,115 B2 | 3/2016 | Kauhanen |
| 9,304,348 B2 | 4/2016 | Jang |
| 9,304,637 B2 | 4/2016 | Huang |
| 9,323,393 B2 | 4/2016 | Djordjev et al. |
| 9,329,719 B2 | 5/2016 | Molne et al. |
| 9,342,179 B2 | 5/2016 | Fuji et al. |
| 9,360,977 B2 | 6/2016 | Aberg |
| 9,367,173 B2 | 6/2016 | Setlak |
| 9,383,848 B2 | 7/2016 | Daghigh |
| 9,406,013 B2 | 8/2016 | Suwald |
| 9,415,517 B2 | 8/2016 | Naidu |
| 9,417,696 B2 | 8/2016 | DeLuca |
| 9,417,725 B1 | 8/2016 | Watazu et al. |
| 9,454,268 B2 | 9/2016 | Badaye et al. |
| 9,459,734 B2 | 10/2016 | Day |
| 9,466,783 B2 | 10/2016 | Olien et al. |
| 9,471,169 B2 | 10/2016 | Schediwy et al. |
| 9,477,342 B2 | 10/2016 | Daverman et al. |
| 9,501,167 B2 | 11/2016 | Day |
| 9,507,456 B2 | 11/2016 | Watazu et al. |
| 9,519,378 B2 | 12/2016 | Watazu et al. |
| 9,542,028 B2 | 1/2017 | Filiz et al. |
| 9,557,857 B2 | 1/2017 | Schediwy |
| 9,562,814 B2 | 2/2017 | Kulkarni et al. |
| 9,563,317 B2 | 2/2017 | Sleeman et al. |
| 9,612,170 B2 | 4/2017 | Vosgueritchian et al. |
| 9,632,629 B2 | 4/2017 | Prendergast |
| 9,639,224 B2 | 5/2017 | Lee |
| 9,654,883 B2 | 5/2017 | Fuji et al. |
| 9,658,722 B2 | 5/2017 | Schwartz |
| 9,665,197 B2 | 5/2017 | Haffenden et al. |
| 9,665,200 B2 | 5/2017 | Filiz et al. |
| 9,671,918 B2 | 6/2017 | Tsuchihashi et al. |
| 9,690,408 B1 | 6/2017 | Krah |
| 9,690,413 B2 | 6/2017 | Filiz |
| 9,690,414 B2 | 6/2017 | Kano et al. |
| 9,727,157 B2 | 8/2017 | Ham |
| 9,729,730 B2 | 8/2017 | Levesque et al. |
| 9,759,648 B2 | 9/2017 | Serpe |
| 9,791,968 B2 | 10/2017 | Yang |
| 9,804,725 B2 | 10/2017 | Andoh |
| 9,836,171 B2 | 12/2017 | Watazu et al. |
| 9,841,850 B2 | 12/2017 | Schediwy et al. |
| 9,851,843 B2 | 12/2017 | Mishra et al. |
| 9,851,845 B2 | 12/2017 | Smith et al. |
| 9,864,450 B2 | 1/2018 | Watazu et al. |
| 9,874,965 B2 | 1/2018 | Pedder et al. |
| 9,881,577 B2 | 1/2018 | Wang et al. |
| 9,886,118 B2 | 2/2018 | Vosgueritchian et al. |

(56) References Cited

U.S. PATENT DOCUMENTS

| | | | |
|---|---|---|---|
| 9,904,393 B2 | 2/2018 | Frey et al. | |
| 9,916,073 B1* | 3/2018 | Szeto | G06F 3/0414 |
| 9,916,942 B2 | 3/2018 | Shedletsky | |
| 9,952,703 B2 | 4/2018 | Hoen et al. | |
| 9,965,092 B2 | 5/2018 | Smith | |
| 9,983,715 B2 | 5/2018 | Filiz et al. | |
| 10,002,731 B2* | 6/2018 | Wang | H01H 23/28 |
| 10,006,820 B2 | 6/2018 | Vosgueritchian et al. | |
| 10,007,380 B2 | 6/2018 | Yoon et al. | |
| 10,032,592 B2 | 7/2018 | Brooks et al. | |
| 10,055,048 B2 | 8/2018 | Smith | |
| 10,101,866 B2 | 10/2018 | Kano et al. | |
| 10,175,736 B2 | 1/2019 | Kim | |
| 10,185,397 B2 | 1/2019 | Yoneoka et al. | |
| 10,216,326 B2* | 2/2019 | Sato | G06F 3/0412 |
| 2002/0149571 A1 | 10/2002 | Roberts | |
| 2004/0263483 A1 | 12/2004 | Aufderheide | |
| 2006/0043508 A1 | 3/2006 | Ohta et al. | |
| 2006/0191350 A1* | 8/2006 | Meehan | G01L 9/0075 |
| | | | 73/780 |
| 2007/0159561 A1 | 7/2007 | Chien | |
| 2008/0165159 A1 | 7/2008 | Soss et al. | |
| 2008/0218488 A1 | 9/2008 | Yang et al. | |
| 2009/0002199 A1 | 1/2009 | Lainonen et al. | |
| 2009/0267902 A1 | 10/2009 | Nambu et al. | |
| 2009/0312051 A1* | 12/2009 | Hansson | G06F 1/1626 |
| | | | 455/556.1 |
| 2009/0316380 A1 | 12/2009 | Armstrong | |
| 2010/0097344 A1 | 4/2010 | Verweg | |
| 2010/0103115 A1 | 4/2010 | Hainzl | |
| 2010/0117809 A1 | 5/2010 | Dai et al. | |
| 2010/0123686 A1 | 5/2010 | Klinghult et al. | |
| 2011/0045285 A1 | 2/2011 | Saiki et al. | |
| 2011/0051360 A1* | 3/2011 | Dabov | G06F 1/1626 |
| | | | 361/679.55 |
| 2011/0167391 A1* | 7/2011 | Momeyer | G06F 1/1684 |
| | | | 715/863 |
| 2011/0203390 A1* | 8/2011 | Tao | A43B 3/0005 |
| | | | 73/862.046 |
| 2011/0248839 A1 | 10/2011 | Kwok et al. | |
| 2011/0261021 A1 | 10/2011 | Modarres et al. | |
| 2011/0285660 A1 | 11/2011 | Prabhu et al. | |
| 2012/0019448 A1 | 1/2012 | Pitkanen et al. | |
| 2012/0038577 A1 | 2/2012 | Brown et al. | |
| 2012/0105367 A1 | 5/2012 | Son et al. | |
| 2012/0127136 A1 | 5/2012 | Schneider et al. | |
| 2012/0154299 A1 | 6/2012 | Hsu et al. | |
| 2012/0188198 A1 | 7/2012 | Jeong et al. | |
| 2012/0260220 A1* | 10/2012 | Griffin | G06F 3/033 |
| | | | 715/863 |
| 2012/0293491 A1 | 11/2012 | Wang et al. | |
| 2013/0018489 A1 | 1/2013 | Grunthaner et al. | |
| 2013/0074988 A1 | 3/2013 | Chou | |
| 2013/0141365 A1 | 6/2013 | Lynn et al. | |
| 2013/0147739 A1 | 6/2013 | Aberg et al. | |
| 2013/0154933 A1 | 6/2013 | Sheik-Nainar | |
| 2013/0155059 A1 | 6/2013 | Wang et al. | |
| 2013/0215056 A1 | 8/2013 | Johansson et al. | |
| 2013/0222306 A1 | 8/2013 | Aberg et al. | |
| 2013/0328803 A1 | 12/2013 | Fukushima et al. | |
| 2013/0333922 A1 | 12/2013 | Kai et al. | |
| 2014/0085253 A1 | 3/2014 | Leung et al. | |
| 2014/0118635 A1 | 5/2014 | Yang | |
| 2014/0123003 A1* | 5/2014 | Song | G06F 1/1626 |
| | | | 715/701 |
| 2014/0191973 A1 | 7/2014 | Zellers et al. | |
| 2014/0267152 A1* | 9/2014 | Curtis | G06F 3/0414 |
| | | | 345/174 |
| 2014/0327847 A1 | 11/2014 | Park et al. | |
| 2015/0002452 A1 | 1/2015 | Klinghult | |
| 2015/0101849 A1 | 4/2015 | Bockmeyer et al. | |
| 2015/0116260 A1 | 4/2015 | Hoen et al. | |
| 2015/0221460 A1* | 8/2015 | Teplitxky | H01H 13/06 |
| | | | 200/302.2 |
| 2015/0242037 A1 | 8/2015 | Pedder et al. | |
| 2015/0268725 A1 | 9/2015 | Levesque et al. | |
| 2015/0301684 A1 | 10/2015 | Shimamura | |
| 2015/0338304 A1 | 11/2015 | Prud'homme et al. | |
| 2015/0370412 A1 | 12/2015 | Ohba et al. | |
| 2016/0003697 A1 | 1/2016 | Okamoto et al. | |
| 2016/0011708 A1 | 1/2016 | Chung | |
| 2016/0035290 A1 | 2/2016 | Kim et al. | |
| 2016/0041672 A1* | 2/2016 | Hoen | G06F 3/041 |
| | | | 345/173 |
| 2016/0062517 A1 | 3/2016 | Meyer et al. | |
| 2016/0077649 A1 | 3/2016 | Ando et al. | |
| 2016/0103545 A1* | 4/2016 | Filiz | G01L 1/18 |
| 2016/0117035 A1 | 4/2016 | Watazu et al. | |
| 2016/0147353 A1 | 5/2016 | Filiz et al. | |
| 2016/0306481 A1 | 10/2016 | Filiz et al. | |
| 2016/0357297 A1 | 12/2016 | Picciotto et al. | |
| 2016/0358737 A1* | 12/2016 | Brooks | H01H 13/52 |
| 2017/0031495 A1 | 2/2017 | Smith | |
| 2017/0068318 A1 | 3/2017 | McClure et al. | |
| 2017/0090655 A1 | 3/2017 | Zhang et al. | |
| 2017/0191884 A1 | 7/2017 | Vosgueritchian et al. | |
| 2017/0261387 A1 | 9/2017 | Vosgueritchian et al. | |
| 2017/0269757 A1 | 9/2017 | Filiz et al. | |
| 2017/0285799 A1 | 10/2017 | Iuchi et al. | |
| 2017/0285864 A1 | 10/2017 | Pedder et al. | |
| 2018/0059839 A1 | 3/2018 | Kim et al. | |
| 2018/0067612 A1 | 3/2018 | Smith | |
| 2018/0074638 A1 | 3/2018 | Chiang et al. | |
| 2018/0083620 A1* | 3/2018 | Bushnell | H03K 17/9618 |
| 2018/0157363 A1 | 6/2018 | Vosgueritchian et al. | |
| 2018/0217708 A1 | 8/2018 | Hoen et al. | |
| 2018/0292933 A1 | 10/2018 | Hu et al. | |
| 2018/0364850 A1* | 12/2018 | Vosgueritchian | G06F 3/0416 |
| 2019/0025140 A1 | 1/2019 | Smith | |
| 2019/0042046 A1 | 2/2019 | Filiz et al. | |
| 2019/0235688 A1 | 8/2019 | Hoen et al. | |

FOREIGN PATENT DOCUMENTS

| | | |
|---|---|---|
| CN | 1860432 | 11/2006 |
| CN | 101017419 | 8/2007 |
| CN | 101071354 | 11/2007 |
| CN | 101201277 A | 6/2008 |
| CN | 101243383 | 8/2008 |
| CN | 101950224 | 1/2011 |
| CN | 102012772 | 4/2011 |
| CN | 102047088 | 5/2011 |
| CN | 102117158 | 7/2011 |
| CN | 102165400 | 8/2011 |
| CN | 102175362 A | 9/2011 |
| CN | 102308269 | 1/2012 |
| CN | 102368191 | 3/2012 |
| CN | 102460351 | 5/2012 |
| CN | 102591519 | 7/2012 |
| CN | 102822779 | 12/2012 |
| CN | 103026327 | 4/2013 |
| CN | 103069365 | 4/2013 |
| CN | 103197821 | 7/2013 |
| CN | 103336562 | 10/2013 |
| CN | 103582807 | 2/2014 |
| CN | 103955321 | 7/2014 |
| CN | 204461655 U | 7/2015 |
| CN | 104866134 | 8/2015 |
| CN | 204576454 U | 8/2015 |
| CN | 105444662 | 3/2016 |
| CN | 205068342 | 3/2016 |
| CN | 105793803 | 7/2016 |
| EP | 0332365 | 9/1989 |
| EP | 0467562 | 1/1992 |
| EP | 0649116 | 4/1995 |
| EP | 1840714 | 10/2007 |
| EP | 2120136 | 11/2009 |
| EP | 2381340 | 10/2011 |
| EP | 2629075 | 8/2013 |
| FR | 2907563 | 4/2008 |
| JP | 2013503388 | 1/1900 |
| JP | H09511086 | 11/1997 |
| JP | 2008226641 | 9/2008 |

(56) References Cited

FOREIGN PATENT DOCUMENTS

| | | |
|---|---|---|
| JP | 201039458 A | 2/2010 |
| JP | 2010197066 | 9/2010 |
| JP | 2011258530 | 12/2011 |
| JP | 2012053646 | 3/2012 |
| JP | 2012517584 | 8/2012 |
| JP | 2014135010 | 7/2014 |
| WO | WO 96/038833 | 12/1996 |
| WO | WO 02/035461 | 5/2002 |
| WO | WO 07/074800 | 7/2007 |
| WO | WO 08/076393 | 6/2008 |
| WO | WO 11/156447 | 12/2011 |
| WO | WO 12/168892 | 12/2012 |
| WO | WO 13/177322 | 11/2013 |
| WO | WO 14/016429 | 1/2014 |
| WO | WO 15/106183 | 7/2015 |
| WO | WO 15/158952 | 10/2015 |
| WO | WO 16/029354 | 3/2016 |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

Rausch, "Printed piezoresistive strain sensors for monitoring of light-weight structures," Sensor+Test Conferences 2011—Sensor Proceedings, pp. 216-220.

Schweizer, "Electrical characterization and investigation of the piezoresistive effect of PEDOT:PSS thin films," A Thesis Presented to the Academic Faculty in Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, Oct. 15-16, 2012, 1 page.

* cited by examiner

LOAD CELL ARRAY FOR DETECTION OF FORCE INPUT TO AN ELECTRONIC DEVICE ENCLOSURE

FIELD

Embodiments described herein relate to a user input system for an electronic device, and, in particular, to a force input sensor configured to detect force input provided to an electronic device enclosure resistant to local elastic deformation.

BACKGROUND

An input sensor for an electronic device can detect when a user applies a force—generally referred to as a "force input"—to a surface of that electronic device. Such sensors, together with associated circuitry and structure, can be referred to as "force input sensors."

A conventional force input sensor can be coupled to an interior sidewall of an electronic device enclosure to detect a local deformation of the enclosure resulting from a force input applied to an exterior side or edge of the enclosure. However, many electronic device enclosures are formed from a material resistant to local elastic deformation, such as stainless steel, sapphire, ceramic, glass, structured metal, structured plastic, and so on. In other examples, a user of an electronic device may prefer to protect the electronic device with a case that diffuses any force input applied across a large area. In these and related examples, a conventional force input sensor is unable to accurately quantify force input applied to an external side or edge of the electronic device enclosure because the deformation of the enclosure is too small to be detected.

SUMMARY

Embodiments described herein reference an electronic device including an enclosure. The enclosure has an interior sidewall opposite an exterior sidewall. The exterior sidewall is configured to receive a force input. The electronic device includes a force input sensor coupled to the interior sidewall. A second compression plate of the force input sensor is separated from a first compression plate by a gap so as to define a volume between the first compression plate and the second compression plate. The electronic device also includes a pair of supports extending into the volume from opposite ends of the first compression plate. The electronic device also includes a strain concentrator extending into the volume from the second compression plate. A flexible substrate is disposed within the volume between the first compression plate and the second compression plate. The flexible substrate includes a first side coupled to the pair of supports and a second side interfacing the strain concentrating feature. A strain sensor is disposed on the second side of the flexible substrate. As a result of this configuration and construction, the force input sensor permits the first compression plate to move toward the second compression plate in response to the force input applied to the exterior sidewall of the enclosure. In response to the movement, the strain concentrator induces a bending moment in the flexible substrate, straining the strain sensor.

Further embodiments described herein reference an electronic device enclosure. The enclosure includes an exterior surface configure to receive a force input and an interior surface opposite the exterior surface. A loading feature extends from the interior surface. A structure is separated from the interior surface and defines a support. A flexible substrate contacts the loading feature and is coupled to the support. The enclosure also includes a strain sensor disposed on the flexible substrate. As a result of this configuration and construction, the interior surface is able to move in response to the force input, causing the loading feature to induce a bending moment in the flexible substrate inducing a strain in the strain sensor.

Still further embodiments described herein reference method for manufacturing a force input sensor for an enclosure of an electronic device. The method includes the operations of: defining a loading feature on a first compression plate; defining a support feature on a second compression plate; coupling a flexible substrate (with a strain sensor) to the support feature of the second compression plate; aligning the loading feature of first compression plate with the strain sensor of flexible substrate; and coupling the first compression plate to the second compression plate.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
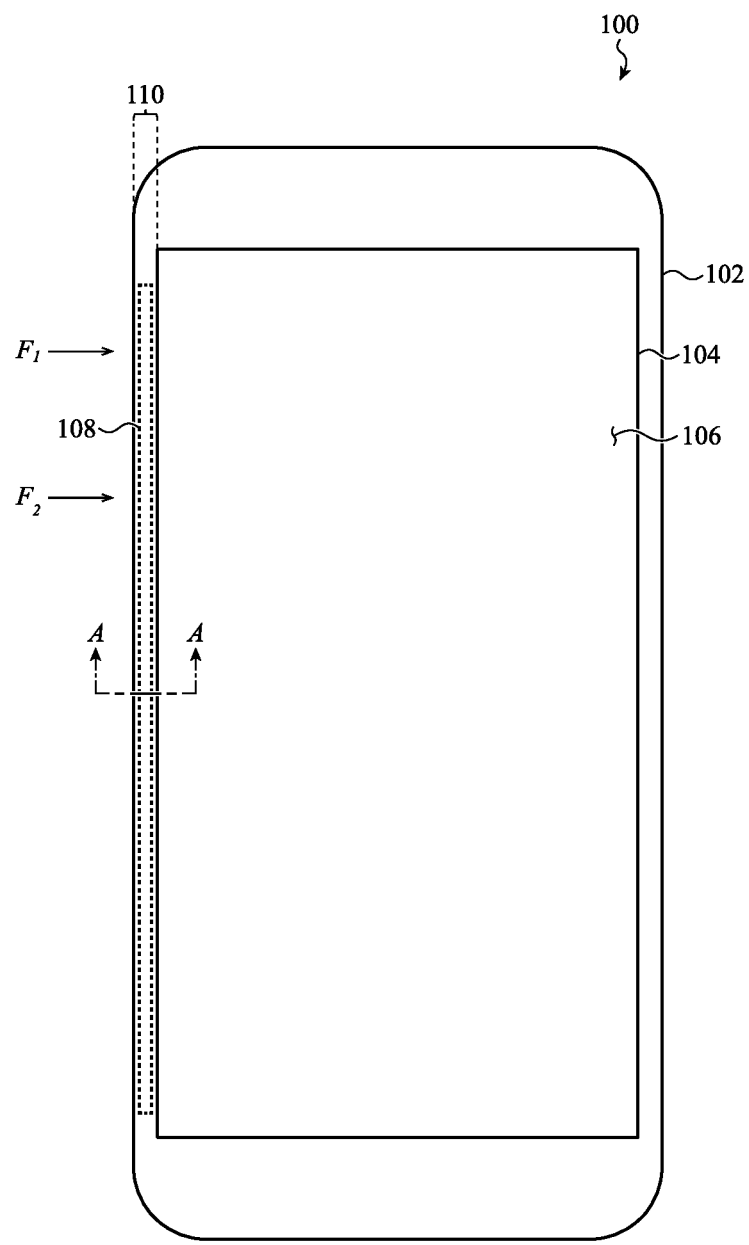
FIG. 1 depicts an electronic device having an enclosure incorporating a force input sensor, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference a force input sensor configured to couple to an internal edge or internal sidewall of an electronic device enclosure formed from one or more materials (and/or into a structure) that is resistant to local elastic deformation, such as, but not limited to: stainless steel, glass, sapphire, ceramics, structured metals or plastics, and/or carbon fiber.

More specifically, a force input sensor, such as described herein, defines and/or includes a compressible structure—referred to herein as a "load cell"—that includes two compression plates, separated from one another so as to define a volume between them. Typically, the compression plates are rectangular, and have a high aspect ratio (e.g., 5:1), although this may not be required. In many embodiments, a flexible spacer separates the two compression plates, but this may not be required.

A load cell, such as described herein, also includes a diaphragm positioned within, and extending across, the volume between the compression plates along a length of the compression plates. In typical implementations, one of the two compression plates includes a set or pair of supports defined at opposite ends of that compression plate. The supports extend, at least partly, into the volume defined between the compression plates. The supports also define attachment points for coupling opposite ends of the diaphragm to the compression plate, in order to suspend the diaphragm within the volume between the supports and between the two compression plates and, optionally, maintain tension in the diaphragm. The other compression plate of the load cell includes a loading feature coupled to—or formed integrally with—a central region of a length of that compression plate. In this manner, the loading feature extends into the volume in a direction opposite that of the supports. The loading feature extends toward—and, in many cases, contacts or otherwise abuts—a side of the diaphragm opposite the side of the diaphragm attached to the supports at the attachment points. In other words, when the load cell is assembled, the loading feature and the supports are on opposite sides of the diaphragm.

The load cell also includes a strain sensor disposed on the diaphragm, between the supports and below the loading feature. The strain sensor is electrically coupled to a measurement circuit configured to directly or indirectly measure an electrical property or effect of the strain sensor, such as, but not limited to: charge, inductance, resistance, capacitance, and so on.

As a result of this construction, the diaphragm, the loading feature, and the attachment points of the supports cooperate to define a three-point bending apparatus configured to adapt a compressive force applied to the compression plates into a strain experienced by the strain sensor on the diaphragm. More specifically, when a compressive force is applied to the compression plates, the flexible spacer compresses, reducing the distance between the compression plates. The reduced distance between the compression plates causes the loading feature and the supports to extend further into the volume, bending the diaphragm as a result. The bending moment induced in the diaphragm by the loading feature in turn induces a tension or compression in the strain sensor. In this manner, a relatively small change in the distance between the compression plates is adapted into a measurable strain in the strain sensor that can be electrically quantified by the measurement circuit (e.g., as a change in charge, resistance, capacitance, or inductance, and/or as a change in a signal applied to, or generated by, the strain sensor, such as a voltage signal, a current signal, a change in frequency, and so on).

In some embodiments, more than one support may not be required. In these examples, the diaphragm can be configured to cantilever, bending at a single point of inflection in response to a force applied by the loading feature.

As noted above, a load cell of a force input sensor, such as described herein, can be directly coupled to—and, in some cases, integrally formed with—an internal surface of a sidewall of an electronic device enclosure. More specifically, a compression plate of a load cell can be coupled to an internal surface of the sidewall. As a result of this construction, a force input applied by a user to an edge or a side of the electronic device enclosure compresses the load cell, which, as noted above, induces a strain in the strain sensor. Thereafter, the strain can be measured or inferred by the measurement circuit—using any suitable technique—and correlated to a magnitude of force corresponding to the force input provided by the user. In turn, a processor or circuit within the electronic device and communicably coupled to the measurement circuit can interpret the magnitude of force input from the measurement circuit as a user input to the electronic device.

In many embodiments, a force input sensor, such as described herein, is implemented with an array of independent load cells arranged in a pattern. For example, a force input sensor including an array of load cells arranged in a row can be disposed along a whole or partial length of an interior surface of a sidewall of an electronic device enclosure. As a result of this construction, a force input can be localized to a particular point or region of an external edge of the electronic device based on output obtained by the measurement circuit from one or more of the load cells of the force input sensor. In this example, the compression plates of adjacent load cells can be coupled together, but this may not be required.

In another example, a force input sensor includes four separate load cells arranged at corners of an electronic device housing. As a result of this construction, a force input can be localized to a particular corner or region of the exterior surface of the electronic device.

Accordingly, generally and broadly, it is understood that a force input sensor—such as described herein—can be used to detect one or more characteristics of one or more force inputs applied by a user of an electronic device to an edge or sidewall (or other surface) of an enclosure of the electronic device, substantially independent of the materials and/or constructions selected to manufacture the enclosure of the electronic device. Further, as a result of the constructions described herein, force inputs can be detected by a force input sensor of an electronic device substantially independent of a user's decision to protect the electronic device within a case that, as noted above, may be manufactured from a material and/or into a structure resistant to local elastic deformations and/or that may have the effect of diffusing local force inputs across a larger area.

For example, a force input sensor—such as described herein—may be configured to determine, without limitation: a location or region of the enclosure at which the force input is applied; a magnitude of the force input applied; a time derivative of the magnitude or the location of the force input applied; a force input gesture (e.g., a change in location and/or magnitude of a force input according to a pattern such as a swipe gesture, a press and release gesture, and so on); and so on. For simplicity of description, the embodiments that follow reference a force input sensor configured to quantify a magnitude of a force input applied by a user of an electronic device to an external edge or sidewall of an enclosure of that electronic device. It may be appreciated, however, that this is merely one category of example, and that additional or alternative characteristics of force input can be determined by a force input sensor—and/or a circuit coupled to a force input sensor—such as described herein.

As such, in view of the foregoing and following embodiments, it is understood that any suitable electronic device can include one or more force input sensors such as described herein, whether such force input sensors are coupled to an internal sidewall of an enclosure and/or to other components of the electronic device. Accordingly, for simplicity of description, the embodiments that follow reference a set of example constructions in which a force input sensor is coupled to—either directly or indirectly—an internal sidewall or internal edge of an enclosure of an electronic device. It is appreciated, however, that this is merely one example and that other configurations are possible in view of the embodiments described herein.

Additionally, it is understood that an electronic device including a force input sensor coupled to its enclosure can utilize the output(s) obtained from the measurement circuit of the force input sensor for any suitable purpose. For example, the electronic device may perform different functions in response to different detected force input characteristics, force input gestures, force input locations, and so on. Example functions that can be performed by the electronic device in response to a force input can include, but are not limited to: triggering launch, termination, or execution of a particular application or function of the electronic device (e.g., launching a virtual assistant, a calendar application, a voice memo application, a cellular phone application, and so on); increasing audio output volume in response to a force input (and/or gesture) provided to an upper portion of an edge of the enclosure; decreasing audio output volume in response to a force input (and/or gesture) provided to a lower portion of an edge of the enclosure; changing a power state of the electronic device (e.g., powered on, powered off, standby, and so on) in response to a force input to a top edge of the enclosure; modifying a graphical user interface in response to a force input (and/or gesture) applied to an edge of the enclosure; and so on.

These and other embodiments are discussed below with reference to FIGS. 1-13. However, those skilled in the art will readily appreciate that the detailed description given herein with respect to these figures is for explanatory purposes only and should not be construed as limiting.

FIG. 1 depicts an electronic device having an enclosure incorporating a force input sensor including a load cell array, such as described herein. In particular, FIG. 1 depicts an electronic device 100 including an enclosure 102 (also referred to as a "housing") and a touch-sensitive display 104 to generate a graphical user interface to encourage user interaction.

The enclosure 102 of the electronic device 100 can form an outer surface and protective case for the internal components of the electronic device 100, including the notification system. In the illustrated embodiment, the enclosure 102 is formed in a substantially rectangular shape, although this is not required. The enclosure 102 can be formed of one or more components operably connected together, such as, but not limited to: a frame, a front cover, and a back cover; or a top clamshell and a bottom clamshell enclosed around an internal frame. Alternatively, the enclosure 102 can be formed of a single piece (e.g., a uniform body) of material. The enclosure 102 may be planar, or may be partially or entirely curved.

The touch-sensitive display 104 may include one or more touch sensors and/or force sensors that are configured to detect various combinations of user touch and force input on the exterior surface (e.g., the input surface 106) of the touch-sensitive display 104. More specifically, the touch and/or force sensors may be used separately or in combination to interpret a broad range of user inputs such as, but not limited to: touch-based gestures; force-based gestures; touch patterns; tap patterns; single-finger gestures; multi-finger gestures; multi-force gestures; and so on.

The touch sensors and/or force sensors may be configured to interpret user input by comparing real-time touch and/or force input to one or more thresholds that may be static or variable, such as, but not limited to: downstroke force thresholds; upstroke force thresholds; movement thresholds; force magnitude thresholds; location thresholds; and so on. In addition, the touch and/or force sensors of the touch-sensitive display 104 may be configured to detect rates of change in touch input, force input, gesture input, or any combination thereof, that is provided by a user to the input surface.

The touch and/or force sensors associated with the touch-sensitive display 104 may be implemented in any number of suitable ways with any suitable technology or combination of technologies including, but not limited to: self-capacitance touch sensing; mutual capacitance touch sensing; resistive touch sensing; optical touch sensing; acoustic touch sensing; capacitive force sensing; strain-based force sensing; optical force sensing; acoustic force sensing; and so on, or any combination thereof. The touch and/or force sensors may be independently or mutually addressable and may be distributed and/or segmented and disposed relative to an active display region and/or a bezel region surrounding the touch-sensitive display 104.

It may be appreciated that the touch-sensitive display 104 can be implemented with any suitable technology, including, but not limited to, a multi-touch or multi-force sensing touchscreen that uses liquid crystal display technology, light-emitting diode technology, organic light-emitting display technology, organic electroluminescence technology, or another type of display technology.

The electronic device 100 also includes a force input sensor 108, separate from the touch-sensitive display 104. In the illustrated example, the force input sensor 108 is disposed within the enclosure 102, and positioned behind an opaque bezel 110 adjacent to, and surrounding, the touch-sensitive display 104. In this manner, the force input sensor 108 is obscured from view by the opaque bezel 110.

As noted with respect to other embodiments described herein, the force input sensor 108 is typically coupled to an internal sidewall of the enclosure 102. As a result of this construction, the force input sensor 108 can receive force inputs provided to the sidewall of the enclosure 102, such as the force input $F_1$ and the force input $F_2$ shown in FIG. 1.

In some examples, such as shown in FIG. 1, the force input sensor 108 can extend along a substantial portion of the sidewall of the enclosure 102—such as depicted in FIG. 1—but this may not be required. For example, in other embodiments, the electronic device 100 can be configured to include, without limitation: more than one force input sensor arranged along a single sidewall of the enclosure 102; one or more force input sensors arranged along each sidewall of the enclosure 102; a single force input sensor extending around a periphery of the enclosure 102; a single force input sensor disposed on a bottom or a top sidewall of the enclosure 102; and so on. As such, generally and broadly, it may be appreciated that any suitable number of force input sensors—such as described herein—can be configured in any suitable manner and can be incorporated into any suitable electronic device enclosure or housing.

More specifically, it may be appreciated that the foregoing embodiments depicted in FIG. 1 and the various alternatives thereof and variations thereto are presented, generally, for purposes of explanation, and to facilitate an understanding of various alternative configurations of a force input sensor and the various components thereof, such as described herein. However, it will be apparent to one skilled in the art that some of the specific details presented herein may not be required in order to practice a particular described embodiment, or an equivalent thereof.

For example, although the electronic device 100 is depicted as a cellular telephone, it may be appreciated that this is merely one example and that a force input sensor, such as described herein, may be incorporated into any suitable electronic device, system, or accessory including but not limited to: portable electronic devices (e.g., battery-powered, wirelessly-powered devices, tethered devices, and so on); stationary electronic devices; control devices (e.g., home automation devices, industrial automation devices, aeronautical or terrestrial vehicle control devices, and so on); personal computing devices (e.g., cellular devices, tablet devices, laptop devices, desktop devices, and so on); wearable devices (e.g., implanted devices, wrist-worn devices, eyeglass devices, goggle devices, augmented or virtual reality display or projector devices, and so on); accessory devices (e.g., protective covers such as keyboard covers for tablet computers, stylus input devices, charging devices, and so on); and so on.

Accordingly, for simplicity of description, the embodiments that follow reference an electronic device with a force input sensor coupled to a single internal sidewall of the device's enclosure; as noted above, it may be appreciated that this is merely one example.

A force input sensor, such as the force input sensor 108 and/or such as described in reference to other embodiments described herein, can be coupled, either directly or indirectly, to a sidewall of an electronic device enclosure in a number of suitable ways. Generally and broadly, FIGS. 2A-2D depict four example electronic device enclosure constructions including a force input sensor.

Figure 2A:
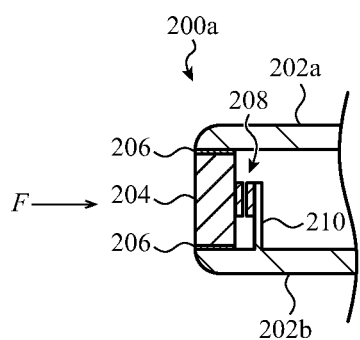
FIG. 2A depicts a simplified cross-section of the force input sensor of FIG. 1, taken through section line A-A.

In particular, FIG. 2A depicts a cross-section of the electronic device 100, taken through section line A-A of FIG. 1, specifically depicting the enclosure 102 now identified as the enclosure 200a. In the illustrated example embodiment, the enclosure 200a includes a front cover 202a, a back cover 202b, and a frame 204. The front cover 202a and the back cover 202b can be adhered to and/or sealed to the frame 204 via an adhesive or sealant, identified as the gasket 206. The force input sensor 108 of FIG. 1 is identified in FIG. 2A as the force input sensor 208. In this embodiment, the force input sensor 208 is positioned between the frame 204 and a support 210 that is coupled to at least one of the front cover 202a or the back cover 202b. In the illustrated example, the support 210 extends from the back cover 202b, but this is merely one example configuration.

As a result of the illustrated example construction, a force input F applied to (and at an angle relative to) an exterior surface of the frame 204 causes the force input sensor 208 to compress. More specifically, the force input F applied to the exterior surface of the frame 204 causes the frame 204 to locally deform, shearing the gasket 206 in a direction parallel to the force input F such that the frame 204 advances toward the support 210 to a degree dependent on the construction and/or materials selected for the enclosure 200a. As a result, the force input sensor 208—or, more particularly, a load cell (not shown) within the force input sensor 208—compresses to a degree dependent on the enclosure 200a and the force input sensor 208. As noted with respect to other embodiments described herein, the compression of the force input sensor 208 can be measured, either directly or indirectly, by a measurement circuit (not shown). Thereafter, the output of the measurement circuit can be correlated to a magnitude of the force input F.

In the illustrated example, the force input F is depicted as being applied normal to an external surface of the frame 204 (e.g., perpendicular to the frame 204), but this is not required; it may be appreciated that a force input F may be applied at a number of suitable angles—each of which may include at least one component normal to the surface of the frame 204—relative to the frame 204 and/or to the force input sensor 208.

Furthermore, the example construction shown in FIG. 2A is merely one example; other embodiments can be implemented in different ways.

Figure 2B:
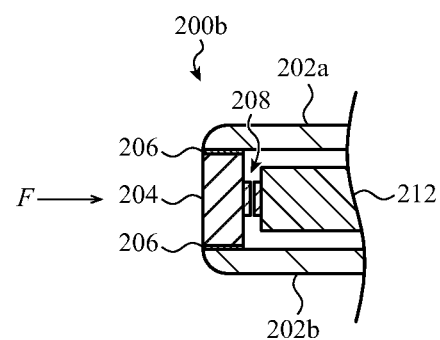
FIG. 2B depicts another example force input sensor configured to detect force input to an electronic device, such as described herein.

For example, FIG. 2B depicts another example construction in which a force input sensor is configured to detect force input applied to an exterior sidewall of an electronic device. As with the embodiment of FIG. 2A, the enclosure 200b includes a front cover 202a, a back cover 202b, and a frame 204 coupled via a gasket 206. In this embodiment, the force input sensor 208 is positioned between the frame 204 and an internal component 212 of the electronic device enclosed within the enclosure 200b. The internal component 212 can be any suitable internal component of an electronic device including, but not limited to: an internal frame or support; a haptic actuator; a camera; a display stack; a battery; a wireless charging coil; a button or input component; a main or daughter logic board; a sensor; an electromagnetic shield; an antenna; and so on.

As a result of the illustrated example construction, similar to the embodiment described above in reference to FIG. 2A, a force input F applied to (and at an angle relative to) an exterior surface of the frame 204 causes the force input sensor 208 to compress. More specifically, the force input F applied to the exterior surface of the frame 204 causes the frame 204 to locally deform, shearing the gasket 206 in a direction parallel to the force input F such that the frame 204 advances toward the internal component 212 to a degree dependent on the construction and/or materials selected for the enclosure 200b. As a result, the force input sensor 208 compresses. The compression of the force input sensor 208 can be measured, either directly or indirectly, by a measurement circuit and, thereafter, the output of the measurement circuit can be correlated to a magnitude of the force input F.

As with the embodiment described above in reference to FIG. 2A, in the illustrated example, the force input F is depicted as being applied normal to an external surface of the frame 204 (e.g., perpendicular to the frame 204), but this is not required; it may be appreciated that a force input F may be applied at a number of suitable angles—each of which may include at least one component normal to the surface of the frame 204—relative to the frame 204 and/or to the force input sensor 208.

Figure 2C:
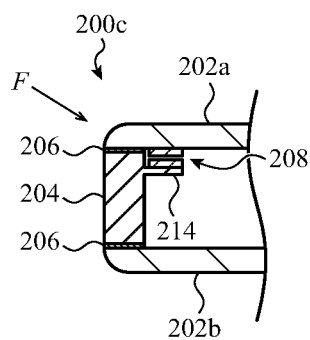
FIG. 2C depicts another example force input sensor configured to detect force input to an electronic device, such as described herein.

FIG. 2C depicts yet another example construction in which a force input sensor is configured to detect force input applied to an exterior sidewall or edge of an electronic device. As with the embodiments of FIGS. 2A-2B, the enclosure 200c includes a front cover 202a, a back cover 202b, and a frame 204 coupled via a gasket 206. In this embodiment, the force input sensor 208 is positioned on a shelf 214 extending from the frame 204 at an angle.

In the illustrated embodiment, the shelf 214 extends perpendicular to an internal surface of the frame 204, but this may not be required; other implementations may find other angles relative to the frame 204 (or relative to another component of the enclosure 200c or the electronic device enclosed by the enclosure 200c) to be preferred and/or otherwise suitable.

In the illustrated embodiment, the force input sensor 208 is also coupled to an internal surface of the front cover 202a. In other words, the force input sensor 208 is disposed in an upper corner of the enclosure 200c, coupling an upper region of the internal surface of the frame 204 to an interior surface of the front cover 202a. It may be appreciated, additionally, that in other examples, the force input sensor 208 can be disposed in a lower corner of the enclosure 200c, coupling a lower region of the internal surface of the frame 204 to the back cover 202b.

As a result of the illustrated example construction, a force input F applied to (and at an angle relative to) an exterior surface of the frame 204 causes the force input sensor 208 to compress and/or shear relative to the front cover 202a. More specifically, the force input F applied to the exterior surface of the frame 204 causes the frame 204 to locally deform, shearing and/or compressing the gasket 206 such that the frame 204 and/or the front cover 202a advances, to some degree, inwardly relative to the enclosure 200c. As a result, the force input sensor 208 shears and/or compresses between the shelf 214 and the front cover 202a. The compression and/or shearing of the force input sensor 208 can be measured, either directly or indirectly, by a measurement circuit and, thereafter, the output of the measurement circuit can be correlated to a magnitude of the force input F.

In the illustrated example, the force input F is depicted as being applied at an angle approximately forty-five degrees offset from an external surface of the frame 204, but this is not required; it may be appreciated that a force input F may be applied at a number of suitable angles—some and/or each of which may include at least one component normal to the surface of the frame 204 and/or at least one component normal to an external surface of the front cover 202a—relative to the frame 204, the front cover 202a, and/or to the force input sensor 208.

Figure 2D:
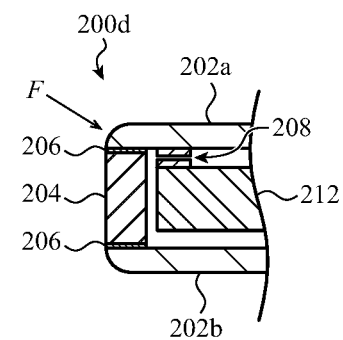
FIG. 2D depicts another example force input sensor configured to detect force input to an electronic device, such as described herein.

FIG. 2D depicts yet another example construction in which a force input sensor is configured to detect force input applied to an exterior sidewall or edge of an electronic device. As with the embodiments of FIGS. 2A-2C, the enclosure 200d includes a front cover 202a, a back cover 202b, and a frame 204 coupled via a gasket 206. In this embodiment, the force input sensor 208 is positioned between the front cover 202a and an internal component 212 of the electronic device enclosed within the enclosure 200d. As with the embodiment described in reference to FIG. 2B, the internal component 212 can be any suitable internal component of an electronic device including, but not limited to: an internal frame or support; a haptic actuator; a camera; a display stack; a battery; a wireless charging coil; a button or input component; a main or daughter logic board; a sensor; an electromagnetic shield; an antenna; and so on.

As a result of the illustrated example construction, a force input F applied to (and at an angle relative to) an exterior surface of the frame 204 causes the force input sensor 208 to compress and/or shear relative to the front cover 202a. More specifically, the force input F applied to the exterior surface of the frame 204 causes the frame 204 and/or the front cover 202a to locally deform, shearing and/or compressing the gasket 206 such that front cover advances inwardly relative to the enclosure 200d. As a result, the force input sensor 208 shears and/or compresses between the shelf 214 and the front cover 202a. The compression and/or shearing of the force input sensor 208 can be measured, either directly or indirectly, by a measurement circuit and, thereafter, the output of the measurement circuit can be correlated to a magnitude of the force input F.

In the illustrated example, as with the embodiment described above in reference to FIG. 2C, the force input F is depicted as being applied at an angle approximately forty-five degrees offset from to an external surface of the frame 204. It may be appreciated that this particular angle is neither required nor preferred; a force input F may be applied at a number of suitable angles—some and/or each of which may include at least one component normal to the surface of the frame 204 and/or at least one component normal to an external surface of the front cover 202a—relative to the frame 204, the front cover 202a, and/or to the force input sensor 208.

The foregoing embodiments depicted in FIGS. 2A-2D and the various alternatives thereof and variations thereto are presented, generally, for purposes of explanation, and to facilitate an understanding of various configurations and constructions of a force input sensor within an electronic device enclosure, and the various components thereof, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments of a force input sensor coupled to an internal surface of an electronic device enclosure are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, although several discrete examples are provided above, it may be appreciated that a force input sensor, such as described herein, can be coupled to an electronic device enclosure in a number of suitable ways. Additional example constructions include: a force input sensor coupled between a first angled shelf (e.g., forty-five degrees) extending from a sidewall of an enclosure and a second angled shelf (e.g., forty-five degrees) extending from a cover of the enclosure such that the force input sensor is oriented at an angle relative to a corner of the enclosure; a first force input sensor coupled relative to an upper cover of an enclosure at which a front cover and a frame of the enclosure meet and a second force input sensor coupled relative to a lower cover of the enclosure at which a back cover and the frame of the enclosure meet; a force input sensor disposed below a display surface of an electronic device enclosure; a force input sensor relative to an interior surface of an electronic device housing opposite a texture, embossment, debossment, or other tactile feature defined on an exterior surface of the enclosure opposite the interior surface and the force input sensor; and so on.

Figure 3A:
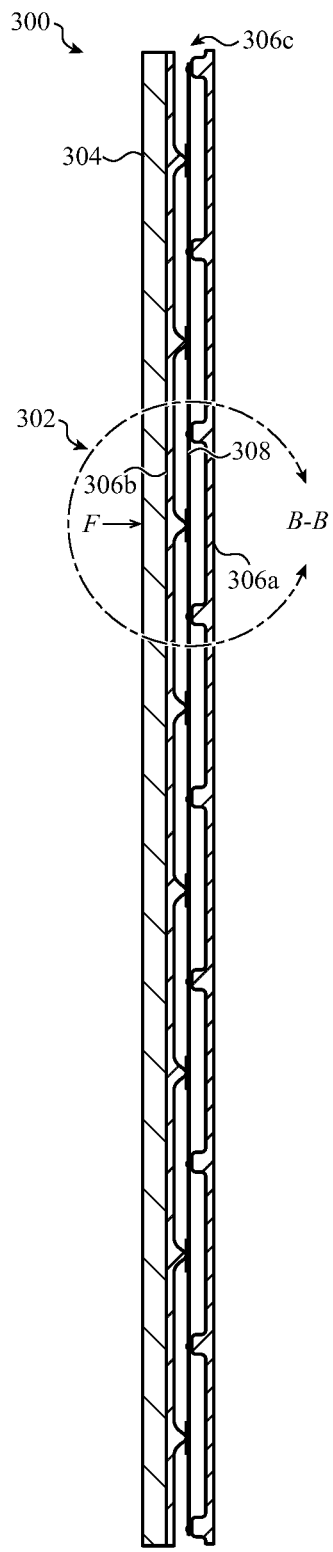
FIG. 3A depicts a force input sensor, such as described herein, including a linear arrangement of independent load cells.
Figure 3B:
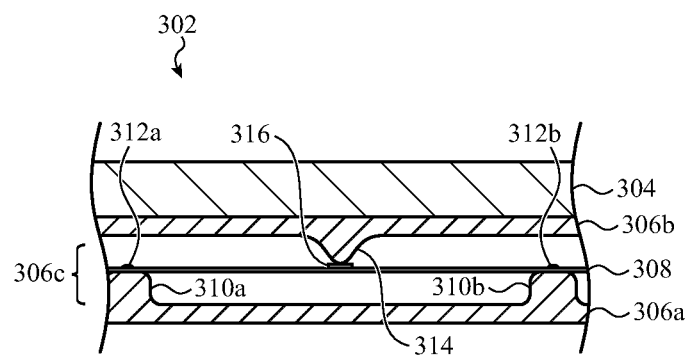
FIG. 3B depicts a rotated detail view of the enclosed circle B-B of FIG. 3A, specifically depicting one load cell of the load cell array of FIG. 3A.
Figure 3C:
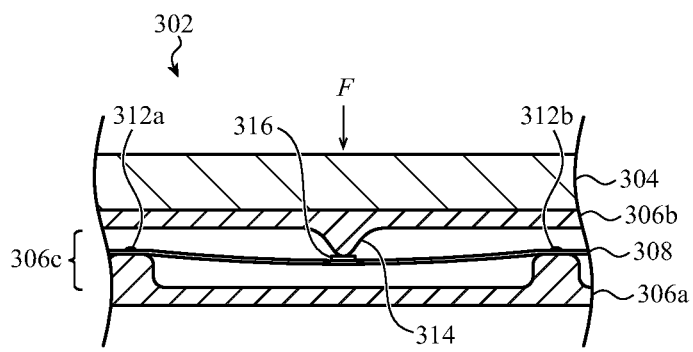
FIG. 3C depicts the load cell of FIG. 3B, showing a diaphragm of the load cell deformed as a result of compression of the load cell.

Generally and broadly, FIGS. 3A-3C depict a cross-section of an example force input sensor—identified as the force input sensor 300—such as described herein. As shown in FIG. 3A, the force input sensor 300 includes an array of load cells, one of which is identified as the load cell 302, shown in detail view in FIGS. 3B-3C. In the illustrated embodiment, eight discrete load cells are depicted, but this is merely one example and other force input sensor embodiments can include a greater or fewer number of load cells.

In the illustrated example, the force input sensor 300 and, likewise, the load cell 302, are coupled to a surface 304. The surface 304—as noted with respect to other embodiments described herein—can be any suitable internal surface (formed from any suitable material, including glass, plastic, metal, ceramic, and so on) of an electronic device enclosure or a component of an electronic device enclosure. In typical examples, the surface 304 is an internal surface of a sidewall of an electronic device enclosure that is resistant to local elastic deformation, such as the enclosure 102 depicted in FIG. 1.

The force input sensor 300 can be coupled to the surface 304 using any suitable fastening, attachment, bonding, or coupling technique. For example, the force input sensor 300 can be coupled to the surface by, without limitation: adhesive; interference fit; welding; co-molding; mechanical fasteners; and so on, or any combination thereof.

In the illustrated embodiment, each load cell of the force input sensor 300—including the load cell 302—includes two compression plates, separated from one another so as to define a volume between them. More specifically, a first compression plate is identified as the compression plate 306a and a second compression plate is identified as the compression plate 306b. The volume defined between the compression plate 306a and the compression plate 306b is identified as the volume 306c. Each load cell also includes a diaphragm 308 positioned within, and extending across, the volume 306c between the compression plates 306a, 306b along a length of the compression plates 306a, 306b.

In the illustrated example, the compression plates 306a, 306b contiguously extend across the entire length of the force input sensor 300. In other words, each of the load cells of the force input sensor 300 share the compression plates 306a, 306b. It may be appreciated, however, that this is merely one example configuration and may not be required of all embodiments. For example, in further cases, adjacent load cells of a force input sensor—such as described herein—can be separated and/or singulated.

In the illustrated example, the compression plates 306a, 306b are rectangular and have a high aspect ratio (e.g., greater than 2:1, greater than 5:1, greater than 10:1, and so on). More specifically, the width of the compression plates 306a, 306b is smaller than the length of the compression plates 306a, 306b. In one specific, non-limiting, example, the load cell 302 is approximately 2 mm in width (a dimension not shown in the two-dimensional cross sections of FIGS. 3A-3C; the width is understood to extend out of or into the page) and 10-15 mm in length. In another example, the load cell 302 is less than 1 mm in width and 20 mm in length. In view of these discrete examples, it may be appreciated that the aspect ratio and general shape of the compression plates 306a, 306b may vary from embodiment to embodiment. Example suitable shapes for the compression plates 306a, 306b include, without limitation: rounded shapes; hexagonal shapes; triangular shapes; and so on.

In typical embodiments, the compression plates 306a, 306b are formed from the same material, but this may not be required. Example suitable materials for the compression plates 306a, 306b include, but are not limited to: metals; plastics; glass; synthetic materials; acrylics; and so on.

In many examples, the compression plates 306a, 306b are formed into a shape or structure, or from a material or combination of materials, that is generally resistant to local deformation. In other words, in these embodiments, the compression plates 306a, 306b are formed such that a compressive force applied to the load cell 302 results in a reduction of the volume 306c and not a substantive deformation of either or both the compression plates 306a, 306b.

The diaphragm 308 extending between the compression plates 306a, 306b is typically formed from a flexible material, such as a plastic or flexible circuit board material. The diaphragm 308 can be supported by stiffeners (not shown), but this may not be required. The diaphragm 308 may be made from a single layer of material or multiple layers of material.

For simplicity of description, many embodiments that follow reference a single load cell—for example, the load cell 302 as shown in the detail view of FIGS. 3B and 3C. It may be appreciated, however, that other load cells of a single force input sensor may be similarly configured.

As noted above, the diaphragm 308 of the load cell 302 is positioned within, and extends across, the volume 306c between the compression plates 306a, 306b.

The compression plate 306a includes two supports, identified as the supports 310a, 310b. The supports 310a, 310b extend, at least partially, into the volume 306c defined between the compression plates 306a, 306b of the load cell 302. The supports 310a, 310b also define attachment points—identified as the attachment points 312a, 312b—for coupling to opposite ends of the diaphragm 308. In this manner, the diaphragm 308 is at least partially suspended within the volume 306c between the supports 310a, 310b and between the compression plates 306a, 306b. In some cases, the attachment points 312a, 312b maintain a select tension in the diaphragm 308, but this may not be required.

In the illustrated example, the supports 310a, 310b are formed integrally with the compression plate 306a. The supports 310a, 310b can be manufactured and/or formed onto the compression plate 306a using any suitable technique including, but not limited to: machining; etching; stamping; ablating; sputtering; deposition; additive manufacturing; and so on.

The compression plate 306b of the load cell 302 includes a loading feature 314 extending from a central region of a length of the compression plate 306b. In some implementations, the loading feature 314 may be referred to as a loading nose, a bending fulcrum, a force applicator, a strain concentrator, a force concentrator, a force concentrating feature, a protrusion, or a strain concentrating feature. The loading feature 314 extends into the volume 306c in a direction opposite that of the supports 310a, 310b. In this example, the loading feature 314 extends toward, and interfaces with, the diaphragm 308.

As with the supports 310a, 310b, in the illustrated example, the loading feature 314 is formed integrally with the compression plate 306b, but this may not be required. In typical examples, such as shown, the loading feature 314 has an inverted curve profile, such as an inverted Gaussian curve or inverted normal curve. In other cases, a curved profile may not be required. Other suitable profile shapes for a loading feature, such as described herein (e.g., the loading feature 314) include, but are not limited to: a triangular profile; a circular profile; a multi-face profile; and so on.

Also as with the supports 310a, 310b, the loading feature 314 can be manufactured and/or formed onto the compression plate 306b using any suitable technique including, but not limited to: machining; etching; stamping; ablating; sputtering; deposition; additive manufacturing; and so on.

The load cell 302 also includes a strain sensor 316 disposed on the diaphragm 308, between the supports 310a, 310b and below the loading feature 314. The strain sensor 316 is electrically coupled to a measurement circuit (not shown) configured to directly or indirectly measure a change in an electrical property or effect of the strain sensor 316, such as, but not limited to changes in: charge, inductance, resistance, capacitance, and so on.

In many embodiments, the strain sensor 316 is defined by an electrical trace formed from a piezoresitive material that follows a serpentine pattern disposed on an outer surface of the diaphragm 308. However, it may be appreciated that this configuration is merely one example; additional or alternative strain sensor types, electrical trace patterns, and strain sensor distribution patterns may be suitable.

Example suitable strain sensor types that may be suitable in certain implementations include, without limitation: piezoelectric strain sensors; capacitive strain sensors; inductive strain sensors; and so on.

Examples suitable electrical trace patterns include, but are not limited to: vertically-aligned serpentine patterns (e.g., disposed on opposite surfaces of the diaphragm 308); horizontally-aligned serpentine patterns (e.g., disposed on the same surface of the diaphragm 308); angled serpentine patterns; spiral patterns; double-back spiral patterns; interdigitated serpentine patterns; comb patterns; rectilinear patterns; curved patterns; polygonal patterns; and so on, or any combination thereof.

Example embodiments including more than one strain sensor on the diaphragm 308 can include, but may not be limited to: multiple discrete and individually-addressable strain sensors disposed in regular patterns, irregular patterns, tessellated patterns, repeating patterns, multi-layer patterns, single-layer patterns, and so on; a strain sensing network including multiple discrete strain sensors electrically coupled in a balancing network, such as a Wheatstone bridge or a voltage divider; an auxiliary strain sensor disposed onto a surface of one or both of the compression plates 306a, 306b; an auxiliary strain sensor disposed onto a surface of the loading feature 314; an auxiliary strain sensor disposed onto a surface of the supports 310a, 310b; an auxiliary strain sensor formed within and/or encapsulated by the diaphragm 308; and so on, or any combination thereof.

As a result of the illustrated construction of the load cell 302 (see, e.g., FIG. 3B), the diaphragm 308, the loading feature 314, and the attachment points 312a, 312b of the supports 310a, 310b cooperate to define a three-point bending apparatus configured to adapt a compressive force applied to the compression plates 306a, 306b into a strain experienced by the strain sensor 316 on the diaphragm 308.

More specifically, when a compressive force F is applied to the compression plates (see, e.g., FIG. 3C), the volume 306c compresses, reducing the distance between the compression plates 306a, 306b. The reduced distance between the compression plates 306a, 306b causes the loading feature 314 (and, additionally or alternatively, the supports 310a, 310b) to extend further into the volume 306c, bending the diaphragm 308 as a result.

The bending moment induced in the diaphragm 308 by the loading feature 314 in turn induces a tension or compression in the strain sensor 316 that can be measured by the measurement circuit. In this manner, a relatively small change in the distance between the compression plates 306a, 306b is adapted into a measurable strain in the strain sensor 316 that can be quantified by the measurement circuit (e.g., as a change in charge, resistance, capacitance, or inductance, and/or as a change in a signal applied to, or generated by, the strain sensor 316, such as a voltage signal, a current signal, a change in frequency, and so on).

More specifically, in operation, the measurement circuit (which can be an analog or digital circuit, processor, or combination thereof) can be configured to apply an electrical signal (a "stimulus signal" or a "drive signal") to an input lead of the strain sensor 316. After applying the stimulus signal to the strain sensor 316, the measurement circuit can receive or obtain a sense signal from an output lead of the strain sensor 316.

Thereafter, the measurement circuit (or another processor or circuit) can analyze or otherwise process the sense signal to quantify an electrical property of the strain sensor 316 (e.g., inductance, reactance, resistance, capacitance, and so on) that corresponds to one or more physical dimensions of that sensor, such as, but not limited to: length; width; or area.

For example, as noted above, in many cases the strain sensor 316 is formed from peizoresistive material that exhibits a change in resistance proportional to a change in length. In other cases, the strain sensor 316 can exhibit a change in inductance as a function of the length or area. In still other cases, the strain sensor 316 can exhibit a change in reactance as a function of the length or area. After determining and/or quantifying the electrical property of the trace, the measurement circuit of the force input sensor 300 can correlate that measurement or quantity to a magnitude of strain experienced by the strain sensor 316. Thereafter, the force input sensor 300—or an electronic device incorporating the same—can correlate the strain experienced by the strain sensor 316 to a magnitude of force input applied.

The foregoing embodiments depicted in FIGS. 3A-3C and the various alternatives thereof and variations thereto are presented, generally, for purposes of explanation, and to facilitate an understanding of various configurations and constructions of a force input sensor, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments of a force input sensor are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4A:
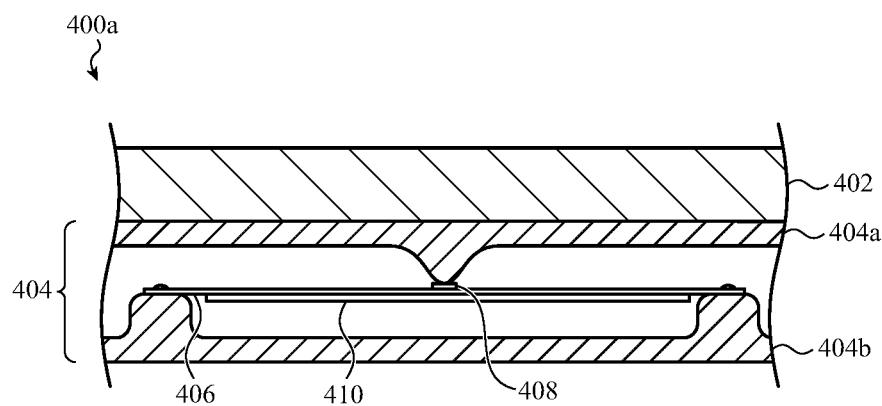
FIG. 4A depicts a load cell, such as described herein, that includes a diaphragm supported by a stiffener.
Figure 4B:
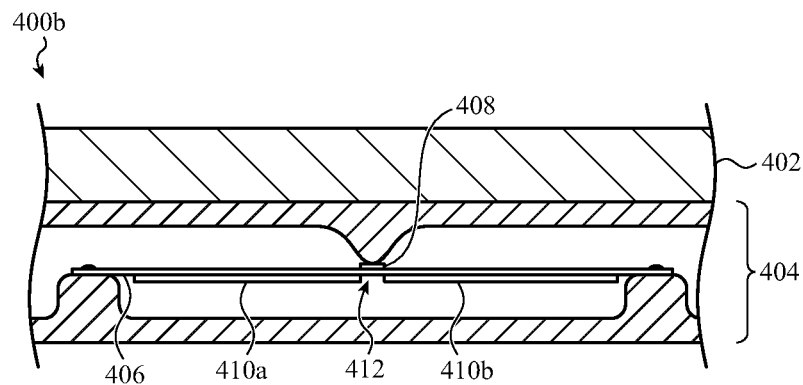
FIG. 4B depicts a load cell, such as described herein, that includes a diaphragm supported by multiple stiffeners.
Figure 4C:
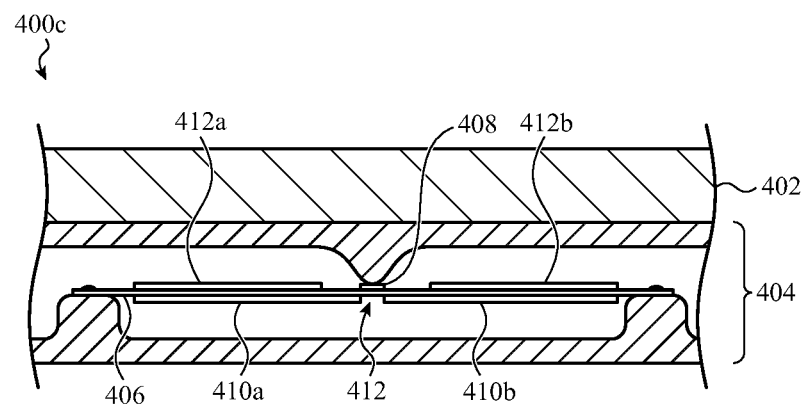
FIG. 4C depicts another load cell, such as described herein, that includes a diaphragm supported by multiple stiffeners.

For example, as noted above, in some examples, a diaphragm of a load cell of a force input sensor, such as described herein, can be supported by a stiffener. A stiffener can serve to concentrate strain in a specific region of the diaphragm by limiting the regions of the diaphragm that flex in response to the bending moment(s) induced by the loading feature of the load cell. FIGS. 4A-4C depict example configurations of a load cell that include one or more stiffeners.

For example, FIG. 4A depicts a load cell 400a. As with other embodiments described herein, the load cell 400a is configured to couple to a surface 402 of an electronic device enclosure. The load cell includes a compressible structure 404 that includes a first compression plate 404a and a second compression plate 404b separated by a gap that defines a volume between the two compression plates. As with other embodiments described herein, a diaphragm 406 is positioned within the gap/volume defined between the compression plates of the compressible structure 404. The load cell 400a also includes a strain sensor 408 disposed on the diaphragm 406. In particular, the strain sensor 408 is disposed on a side of the diaphragm 406 that is facing a loading feature extending from the first compression plate 404a. The load cell 400a also includes a stiffener 410 positioned on a side of the diaphragm 406 opposite the strain sensor 408. As a result of this construction, the stiffener 410 mechanically strengthens the diaphragm 406 to concentrate strain in the strain sensor 408.

In other examples, a stiffener can be positioned in other locations or may take other forms. For example, FIG. 4B depicts a load cell 400b coupled to a surface 402 of an electronic device enclosure. Like the embodiment depicted in FIG. 4A, the load cell 400b includes a compressible structure 404, a diaphragm 406, and a strain sensor 408 disposed on the diaphragm 406. In this example, like the example depicted in FIG. 4A, a stiffener 410 is disposed on a bottom surface of the diaphragm 406, opposite the strain sensor 408. However, different from FIG. 4A, the stiffener 410 depicted in FIG. 4B includes a cutout 412 positioned immediately below the strain sensor 408. In this manner, the stiffener 410 is effectively bifurcated into two sections—a first stiffener section 410a and a second stiffener section 410b. As a result of the cutout 412, the diaphragm 406 is biased to bend (e.g., to strain) in response to a compressive force applied to the load cell 400b in the region defined by the cutout 412, thereby concentrating strain in the diaphragm 406 in a region of the diaphragm 406 associated with the strain sensor 408.

In still other examples, a load cell can include stiffeners on multiple surfaces of a diaphragm. For example, FIG. 4C depicts another load cell 400c coupled to a surface 402 of an electronic device enclosure. Like the embodiments depicted in FIGS. 4A-4B, the load cell 400c includes a compressible structure 404, a diaphragm 406, and a strain sensor 408 disposed on the diaphragm 406. In this example, like the example depicted in FIG. 4B, a stiffener 410 (identified as the stiffener sections 410a, 410b) include a cutout 412 that is disposed on a bottom surface of the diaphragm 406, opposite the strain sensor 408. In this example, a second stiffener is disposed on a top surface of the diaphragm 406. As with the stiffener 410, the stiffener is bifurcated into two sections, identified in the figure as the stiffener section 412a and the stiffener section 412b.

The foregoing embodiments depicted in FIGS. 4A-4C and the various alternatives thereof and variations thereto are presented, generally, for purposes of explanation, and to facilitate an understanding of various configurations and constructions of a stiffener that can support a diaphragm of a load cell, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments of a stiffener of a load cell are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that a stiffener can be formed from any number of suitable materials including, but not limited to: metals; plastics; structured plastics; ceramics; glass; and so on. Similarly, it may be appreciated that a stiffener, such as described herein, can be adhered to or otherwise adhered to a diaphragm in any suitable manner, including but not limited to: adhesive; fasteners; machining; etching; stamping; ablating; sputtering; deposition; additive manufacturing; and so on.

Further, it may be appreciated that one or more stiffeners can be disposed in any suitable pattern on any suitable surface of a diaphragm of a load cell, such as described herein.

Figure 5A:
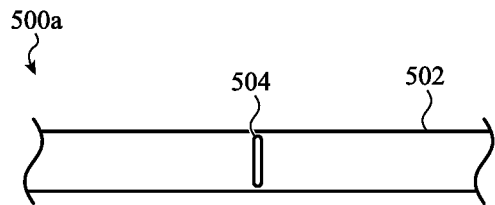
FIG. 5A depicts an example stiffener that can support a diaphragm of a load cell, such as described herein.
Figure 5B:
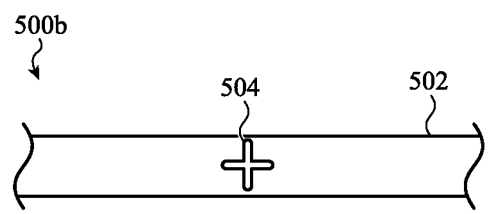
FIG. 5B depicts another example stiffener that can support a diaphragm of a load cell, such as described herein.
Figure 5C:
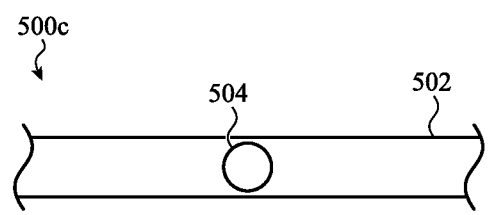
FIG. 5C depicts another example stiffener that can support a diaphragm of a load cell, such as described herein.

In still further examples, it may be appreciated that a stiffener can include one or more cutouts, indents, or other structure that guides or otherwise concentrates strain in the diaphragm in a particular region. For example, generally and broadly, FIGS. 5A-5C depict example stiffeners that can be coupled to a diaphragm of a load cell, such as described herein. Each of the stiffeners depicted in FIGS. 5A-5C include a different cutout shape that may be suitable in certain embodiments to concentrate strain onto a strain sensor disposed onto the diaphragm to which the depicted stiffener is configured to attach.

For example, FIG. 5A depicts an example stiffener that can support a diaphragm of a load cell, such as described herein. In particular, the stiffener—identified as the stiffener 500a—includes a body 502. A cutout 504 is defined entirely or partially through a central region of the body 502. As a result of this construction, the cutout 504 introduces a bias into the body 502 of the stiffener 500a such that when a bending moment is induced into the stiffener 500a (e.g., via a loading feature of a compression plate of a load cell, such as described herein, applying a downward force to a diaphragm to which the stiffener 500a is coupled), the body 502 bends to a greater extent in the region of the body 502 adjacent to the cutout 504. As a result of this construction, a load cell such as described herein incorporating the depicted stiffener can position a strain sensor adjacent to—and/or otherwise aligned with—the cutout 504 of the stiffener in order to effect a concentration of strain in the strain sensor, thereby mechanically amplifying the strain experienced by the strain sensor. In this example, the cutout 504 takes the shape of a rounded rectangle, having a length oriented perpendicular to a length of the body 502. This, however, is merely one example and a cutout such as depicted can be angled and/or positioned in any suitable manner. In other cases, the body 502 can include multiple parallel and/or intersecting cutouts configured in a manner intended to mechanically amplify strain in a particular region of a diaphragm to which the stiffener 500a is coupled.

For example, such as shown in FIG. 5B, a stiffener 500b can include a body 502 through which a cross-shaped cutout, identified as the cutout 504, is defined. As depicted, arms of the cross shape of the cutout 504 are generally aligned with perpendicular and parallel axes relative to a length of the body 502, but this may not be required; in other examples, a cross-shaped cutout can be rotated and/or oriented in another manner.

In yet another example, such as shown in FIG. 5C, a stiffener 500c can include a body 502 through which a circular cutout, identified as the cutout 504, is defined.

The foregoing embodiments depicted in FIGS. 5A-5C and the various alternatives thereof and variations thereto are presented, generally, for purposes of explanation, and to facilitate an understanding of various configurations and constructions of a stiffener including a cutout that can support a diaphragm of a load cell, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments of a cutout of a stiffener of a load cell are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that the specific examples provided in reference to FIGS. 5A-5C are merely examples and that other cutout constructions can be included in other embodiments. For example, without limitation: a cutout of some embodiments may be defined only partially through a body of a stiffener; a cutout of some embodiments can take a shape of, without limitation, a square, a rectangle, an octagon, a triangle, a bowtie shape, an interdigitated shape, a comb shape, and so on; some embodiments include an array of cutouts arranged in a pattern; some embodiments include an array and/or distribution of discrete regions arranged in a pattern, grid, or other manner; and so on.

In still other examples, a stiffener may not be required. For example, FIGS. 6A-6C generally and broadly depict embodiments of a load cell, such as described herein, that may not require a stiffener.

Figure 6A:
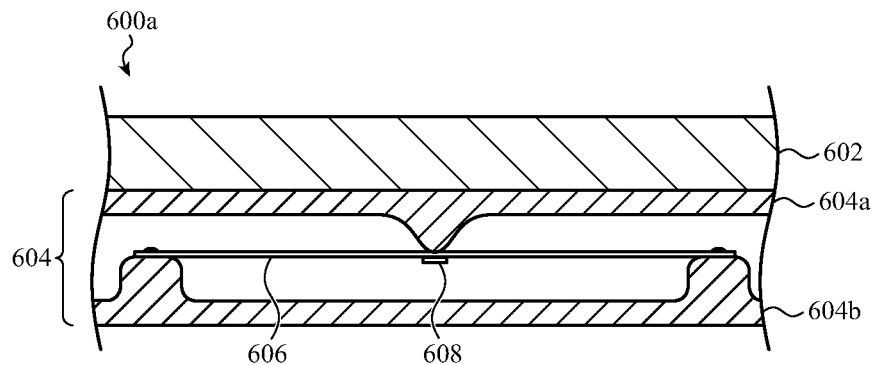
FIG. 6A depicts a load cell, such as described herein, that includes a strain sensor.

For example, FIG. 6A depicts a load cell, such as described herein, that includes a strain sensor disposed on a surface of a diaphragm positioned opposite a loading feature extending from a compression plate that interfaces the diaphragm. In particular, the figure depicts a load cell 600a coupled to a surface 602 of an electronic device enclosure. As with other embodiments described herein, the surface 602 is typically an internal surface of a sidewall of an electronic device enclosure, but this may not be required.

As noted above, the load cell 600a includes a compressible structure 604 that includes a first compression plate 604a and a second compression plate 604b, separated by a gap and defining a volume. In some cases, the gap can be maintained by a flexible spacer positioned between the first compression plate 604a and the second compression plate 604b, but this may not be required of all embodiments. In some cases, the flexible spacer can be made from silicon, plastic, elastic, and/or another material. In still further examples a flexible spacer can be made from a metal or plastic, and formed in the shape of a spring, such as a coil spring or leaf spring. In view of the various examples provided above it may be appreciated that, generally and broadly, a flexible space can be implemented—if required—in any number of suitable ways.

As with other embodiments described herein, the load cell 600a also includes a diaphragm 606 that is disposed within the volume defined between the first compression plate 604a and the second compression plate 604b. More specifically, as with other embodiments described herein, the diaphragm 606 is supported by and between two supports extending from the second compression plate 604b.

The diaphragm 606 also includes a strain sensor 608 that is disposed on a surface of the diaphragm 606 opposite a loading feature that extends from the first compression plate 604a toward, and contacts, abuts, or interfaces, the diaphragm 606.

As a result of this construction, when a compressive force is applied to the load cell 600a, the volume between the compression plates of the compressible structure 604 decreases, thereby causing the loading feature of the first compression plate 604a to induce a bending moment into the diaphragm 606, causing the strain sensor 608 to experience strain. As with other embodiments described herein, the tension or compression experienced by the strain sensor 608 can be measured by a measurement circuit and, thereafter, correlated to an amount of force input applied.

Figure 6B:
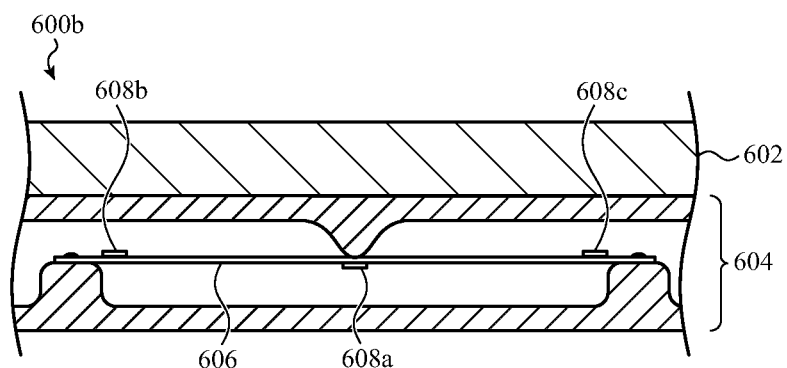
FIG. 6B depicts a load cell, such as described herein, that includes multiple strain sensors.

FIG. 6B depicts another example load cell, such as described herein. The load cell 600b, like the load cell 600a depicted in FIG. 6A, is coupled to a surface 602 of an electronic device enclosure.

The load cell 600b includes a compressible structure 604 that includes a first compression plate and a second compression plate separated by a gap and defining a volume across which and through which a diaphragm 606 is disposed. In this embodiment the diaphragm 606 includes multiple strain sensors, each of which is identified as a strain sensor 608, and each of which is disposed on a surface and/or region of the diaphragm 606 likely to experience strain in response to an induced bending moment in the diaphragm 606.

In particular, in the illustrated embodiment, the load cell 600b includes a first strain sensor 608a disposed on the diaphragm 606 below a first inflection point at which the diaphragm 606 interfaces a loading feature extending from a first compression plate of the compressible structure 604.

In addition, the load cell 600b includes a second strain sensor 608b disposed on the diaphragm 606 relative to a second inflection point at which the diaphragm 606 is coupled to a first support extending from a second compression plate of the compressible structure 604. Similarly, the load cell 600b includes a third strain sensor 608c disposed on the diaphragm 606 relative to a third inflection point at which the diaphragm 606 is coupled to a second support extending from a second compression plate of the compressible structure 604.

As a result of this construction, when a compressive force is applied to the load cell 600b, the volume between the compression plates of the compressible structure 604 decreases, thereby causing the loading feature of the first compression plate to induce a bending moment into the diaphragm 606, causing the strain sensors 608a, 608b, and 608c to experience strain. As with other embodiments described herein, the tension or compression experienced by the strain sensors 608a, 608b, and 608c can be measured by a measurement circuit and, thereafter, correlated to an amount of force input applied.

Figure 6C:
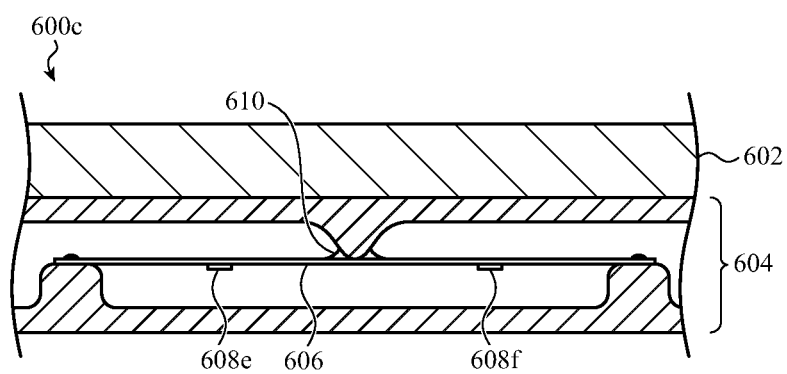
FIG. 6C depicts another load cell, such as described herein, that includes multiple strain sensors.

FIG. 6C depicts yet another example load cell, such as described herein. The load cell 600c, like the load cells depicted in FIGS. 6A-6B, is coupled to a surface 602 of an electronic device enclosure.

As with preceding embodiments, the load cell 600c includes a compressible structure 604 that includes a first compression plate and a second compression plate separated by a gap and defining a volume across which and through which a diaphragm 606 is disposed. Similar to the embodiment of FIG. 6B, in this embodiment, the diaphragm 606 includes multiple strain sensors, each of which is identified as a strain sensor 608, and each of which is disposed on a surface and/or region of the diaphragm 606 likely to experience strain in response to an induced bending moment in the diaphragm 606.

In this embodiment, however, the loading feature extending from the first compression plate is adhered to the diaphragm 606 via an adhesive 610. As a result of the adhesive 610, the diaphragm 606 may be locally strengthened in the region adjacent to the loading feature.

As a result of this construction, the diaphragm 606, the adhesive 610, the loading feature, and the attachment points of the supports cooperate to define a four-point bending apparatus configured to adapt a compressive force applied to the compressible structure 604 into a strain experienced by the strain sensors 608 disposed on the diaphragm 606. More specifically, when a compressive force is applied to the compression plates, the distance between the compression plates reduces. The reduced distance between the compression plates causes the loading feature to extend further into the volume, bending the diaphragm 606 as a result. However, as a result of the mechanical support afforded to the central region of the diaphragm 606 by the adhesive 610, the diaphragm 606 may experience greater strain in regions adjacent to the central region than in the central region itself. Accordingly, as illustrated, the strain sensors 608 (specifically identified as the strain sensor 608e and the strain sensor 608O are positioned adjacent to the central region of the diaphragm 606.

The foregoing embodiments depicted in FIGS. 6A-6C and the various alternatives thereof and variations thereto are presented, generally, for purposes of explanation, and to facilitate an understanding of various distributions of a strain sensor—or more than one strain sensor—on a diaphragm of a load cell, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments of one or more strain sensors despised on a diaphragm of a load cell are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, other load cells can include, without limitation: strain sensors disposed in a two-dimensional array, grid, or matrix; strain sensors of different types (e.g., capacitive, inductive, and so on) disposed relative to different regions of a diaphragm; strain sensors of different constructions disposed relative to different regions of a diaphragm; strain sensors disposed on different sides of a diaphragm; strain sensors disposed on opposite sides of a diaphragm and electrically coupled to one another in a balancing network, such as a Wheatstone bridge; strain sensors disposed within a thickness of a diaphragm; and so on.

Still further load cells can include additional features or components to concentrate strain and/or support one or both compression plates of a compressible structure, such as described herein. For example, generally and broadly, FIGS. 7A-7C depict example load cells that can be supported by flexible spacers formed from any number of suitable materials and/or into any number of suitable structures including, but not limited to: foam; silicone; flexible/corrugated structured plastic; and so on.

Figure 7A:
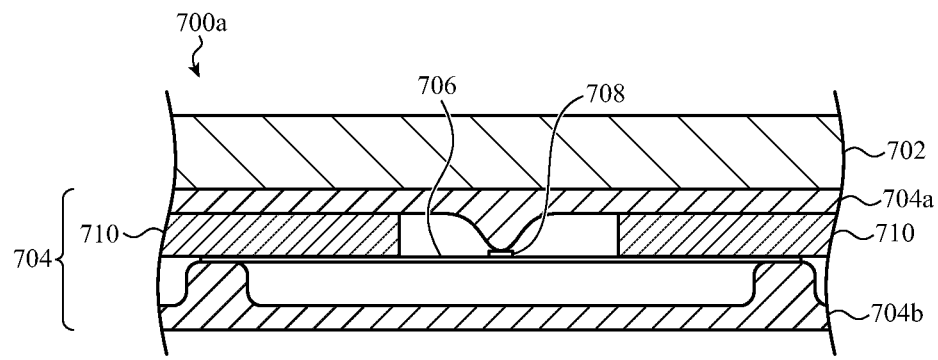
FIG. 7A depicts a load cell, such as described herein, that includes a diaphragm supported by a resilient or flexible spacer.
Figure 7B:
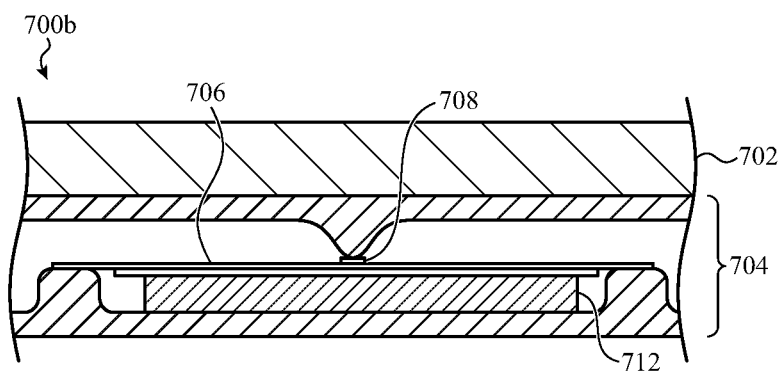
FIG. 7B depicts a load cell, such as described herein, that includes a diaphragm supported by another example resilient or flexible spacer.
Figure 7C:
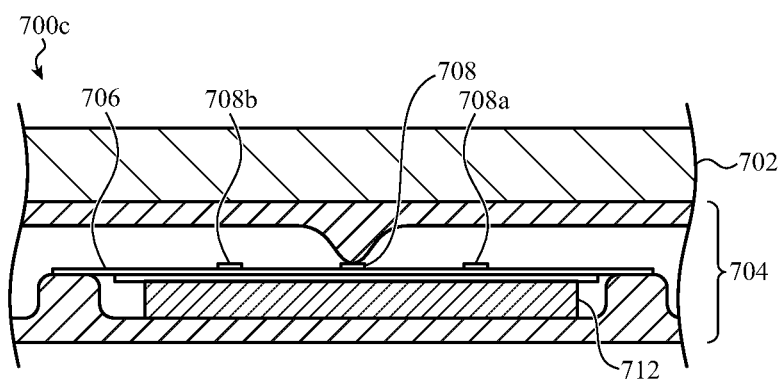
FIG. 7C depicts a load cell, such as described herein, that includes multiple strain sensors and a diaphragm supported by a resilient or flexible spacer.

In particular, FIG. 7A depicts a load cell 700a that, like other embodiments described herein, is coupled to a surface 702. The load cell 700a includes a compressible structure 704 that, in turn, includes a first compression plate 704a and a second compression plate 704b. The compression plates of the compressible structure 704 are separated from one another by a gap so as to define a volume across which a diaphragm 706, including a strain sensor 708, extends.

This embodiment further includes a set of flexible spacers (also referred to herein as "cushioning supports"), identified as the spacers 710, that flexibly couple the first compression plate 704a to the second compression plate 704b. In some cases, the flexible spacers 710 can be formed from a foam or a silicone. In many embodiments, the flexible spacers 710 are adhered to each of the compression plates via an adhesive such as a pressure-sensitive or heat-sensitive adhesive.

In many examples, the flexible spacers 710 can increase the efficiency with which the load cell 700a is manufactured and/or assembled. In particular, the flexible spacers 710 can bond and/or otherwise couple and align the first compression plate 704a to the second compression plate 704b. As a result, the load cell 700a can be manufactured in a roll-to-roll process.

In another example, such as depicted in FIG. 7B, a cushioning support can be disposed below a diaphragm of a load cell such as described herein. In particular, FIG. 7B depicts a load cell 700b that is coupled to a surface 702 and includes a compressible structure 704 that defines a volume. A diaphragm 706 comprising a strain sensor 708 is disposed within the volume. In this example, a cushioning support 712 can be positioned below the diaphragm 706. The cushioning support 712 can be formed from silicon, foam, or any other suitable compressible material. In some examples, the cushioning support 712 can include a liquid.

In some cases, a cushioning support may cause the diaphragm 706 to deform according to a specific profile. For example, in some embodiments, a cushioning support may be made from a material such as silicone that is generally incompressible. As a result, the cushioning support tends to bulge at its edges in response to receiving a downward force in its center. As may be appreciated, the bulging of the cushioning support can cause the diaphragm to bulge as well. In these cases, such as shown in FIG. 7C, one or more additional strain sensors—identified in FIG. 7C as the strain sensors 708a and 708b can be added into the diaphragm in order to measure strain induced by the bulging of the cushioning support 712.

As with the flexible spacers described in reference to other embodiments, in many examples, the cushioning supports depicted in FIGS. 7B-7C can serve to increase the efficiency with which a load cell is manufactured and/or assembled. In particular, the cushioning supports can be disposed onto a compression plate (e.g., such as the second compression plate 704b depicted in FIG. 7A) in advance of attaching a diaphragm to supports extending from that compression plate.

In other words, the cushioning supports can form a substantially flat and/or planar receiving surface onto which a diaphragm can be placed during manufacturing of a load cell. In these embodiments, the cushioning support(s) and/or flexible spacer(s) can bond and/or otherwise couple and align the diaphragm (e.g., the diaphragm 706) to the second compression plate 704b (see, e.g., FIG. 7A). As a result, a load cell, such as described herein, can be manufactured in a roll-to-roll process as a single component to be installed in an electronic device housing in a later process.

The foregoing embodiments depicted in FIGS. 7A-7C and the various alternatives thereof and variations thereto are presented, generally, for purposes of explanation, and to facilitate an understanding of various implementations of a load cell incorporating one or more flexible spacers and/or cushioning supports. However, it will be apparent to one skilled in the art that some of the specific details presented herein may not be required in order to practice a particular described embodiment, or an equivalent thereof.

Thus, it is understood that the foregoing and following descriptions of specific embodiments of a load cell including a flexible spacer and/or a cushioning support are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, a load cell such as described herein can include, without limitation: an array of flexible spacers disposed between a diaphragm and a compression plate; a flexible spacer disposed between a gap defined between a first compression plate and a second compression plate; a cushioning support disposed immediately below a region of a diaphragm that is positioned below a loading feature of a compression plate; and so on.

Furthermore, it may be appreciated that any suitable material can be used to construct a flexible spacer and/or a cushioning support, such as described herein. Suitable materials include, but are not limited to: foam strips; injected, curable foam; silicone strips; elastomeric strips; polymeric strips; pressure-sensitive adhesive; encapsulated liquids; gas bladders; and so on. Similarly, it may be appreciated that a flexible spacer and/or a cushioning support can be disposed and/or formed onto one or more surfaces of a load cell—such as described herein—in any number of suitable ways. Examples include: depositing uncured adhesive onto a surface of a compression plate and curing the uncured adhesive; depositing an adhesive foam strip into a surface of a compression plate; depositing a liquid or gel silicone or elastomer into a surface of a compression plate; and so on. In view of the various examples provided above, it may be appreciated that—for embodiments described herein—a flexible spacer and/or a cushioning support can be formed and/or deposited onto and/or into a load cell, such as described herein using any suitable technique, material, or combination of materials.

Still further load cell embodiments can be implemented in a different manner. For example, preceding embodiments include a first compression plate with a loading feature formed thereon and, additionally, a second compression plate with at least two supports formed thereon. This construction may not be required of all embodiments. For example, generally and broadly, FIGS. 8A-8C depict load cell embodiments in which a loading feature and/or a support can be attached, coupled, or otherwise affixed to (as opposed to being integrally formed with) a compression plate.

Figure 8A:
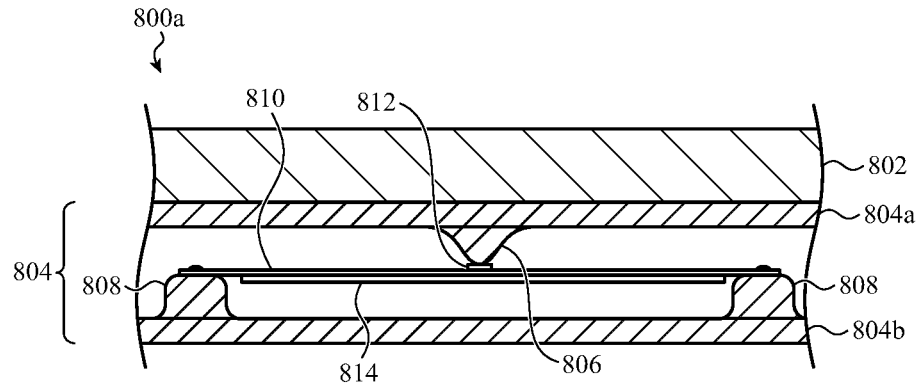
FIG. 8A depicts a load cell, such as described herein, including a loading feature coupled to a compression plate of the load cell.
Figure 8B:
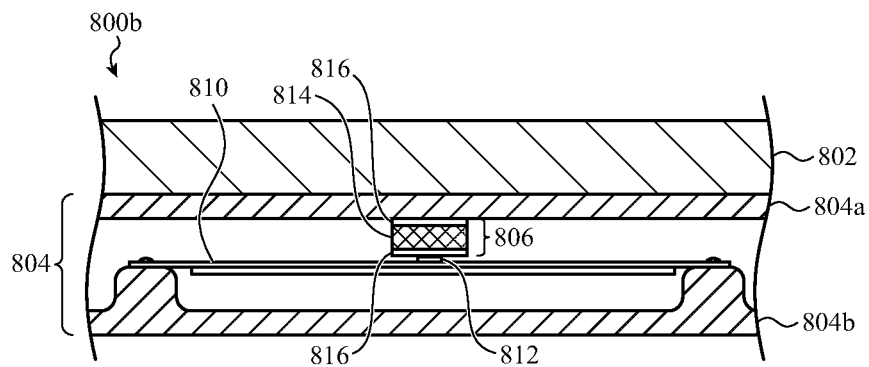
FIG. 8B depicts a load cell, such as described herein, including a loading feature that is formed from multiple layers of material coupled to a compression plate of the load cell.
Figure 8C:
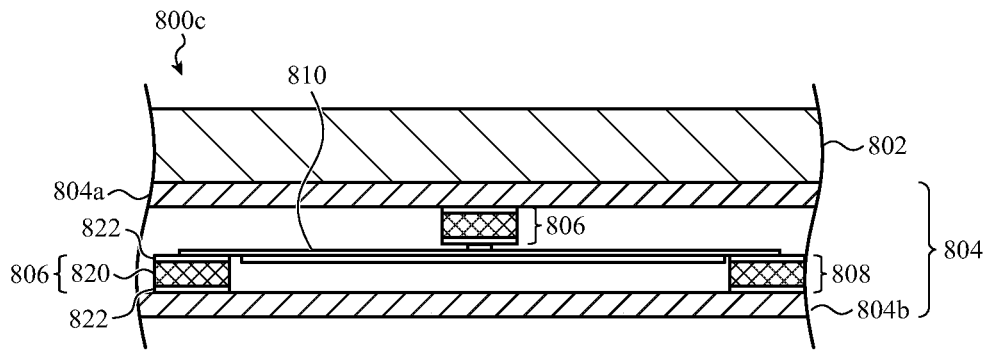
FIG. 8C depicts a load cell, such as described herein, including a loading feature and two support features that are each formed from multiple layers of material and coupled to compression plates of the load cell.

FIG. 8A depicts a load cell 800a coupled to a surface 802 that, like other embodiments described herein, includes a compressible structure 804 defined by a first compression plate 804a and a second compression plate 804b separated by a gap so as to define a volume. The gap between the first compression plate 804a and the second compression plate 804b may be maintained and/or partially defined by a flexible spacer and/or a cushioning support, such as described in reference to FIGS. 7A-7C, but this may not be required. For simplicity if illustration, the load cell 800a is depicted without a flexible spacer and without a cushioning support.

As with other embodiments described herein, the first compression plate 804a includes a loading feature 806 that extends into the volume and the second compression plate 804b includes two supports, identified as the supports 808, that also extend into the volume. The supports define attachment points to couple to a diaphragm 810 that includes a strain sensor 812. Optionally, the diaphragm 810 can be supported by a stiffener 814 or other backing plate (which may include one or more cutouts, such as described in reference to FIGS. 4A-5C).

In this embodiment, in contrast to other embodiments described herein, the loading feature 806 and the supports 808 are not integrally formed with the first compression plate 804a and the second compression plate 804b, respectively. Instead, the loading feature 806 and the supports 808 are attached and/or otherwise coupled to the compression plates in a manufacturing process. The means by which the loading feature 806 and the supports 808 of the load cell 800a are coupled to the compression plates can differ from embodiment to embodiment. Example means of coupling the loading feature 806 and the supports 808 to the compression plates include, but are not limited to: adhesive; interference fit; welding; co-molding; mechanical fasteners; and so on, or any combination thereof.

In this example the loading feature 806 and the supports 808 of the load cell 800a can be formed from the same material as the compression plates, but this may not be required. For example, in some embodiments, the loading feature 806 and the supports 808 of the load cell 800a are formed from metal (e.g., aluminum, steel, magnesium, platinum, titanium, and so on) whereas in other embodiments, the loading feature 806 and the supports 808 of the load cell 800a are formed from plastic and/or acrylic. In some cases, the loading feature 806 and the supports 808 of the load cell 800a can be formed by depositing an uncured adhesive to a surface of a compression plate. After, optionally, allowing or encouraging the uncured adhesive to wet to the surface of the compression plate, the adhesive may be cured, thereby defining one or both the loading feature 806 and the supports 808 of the load cell 800a.

In still further examples, a loading feature and/or a support of a load cell such as described herein can be formed in another manner.

For example FIG. 8B depicts a load cell 800b coupled to a surface 802 that, like other embodiments described herein, includes a compressible structure 804 defined by a first compression plate 804a and a second compression plate 804b separated by a gap so as to define a volume. The first compression plate 804a includes a loading feature 806 that extends into the volume and the second compression plate 804b includes two integrally-formed supports that also extend into the volume. As with other embodiments described herein, the supports define attachment points to couple to a diaphragm 810 that includes a strain sensor 812.

In this embodiment, in contrast to other embodiments described herein, the loading feature 806 is not integrally formed with the first compression plate 804a. Instead, in this example, the loading feature 806 is defined by a shim 814 that interposes the diaphragm 810 and the first compression plate 804a. In many examples, the shim 814 is adhered/coupled to both the diaphragm 810 and the first compression plate 804a via adhesive, identified in the figure as the adhesive layers 816. In other cases, the shim 814 may not be adhered to one or both of the diaphragm 810 or the first compression plate 804a. For example, in these embodiments, the shim 814 may be held in place by friction.

The shim 814 can be formed from any number of suitable materials including, but not limited to: metal; plastic (e.g., poly-ethylene terephthalate, nylons, acrylic, other polymer materials); glass; and so on. The shim 814 can take any number of suitable shapes including, but not limited to: a cubic shape; a linear shape having a rectangular, polygonal, triangular, or other cross-section; a cylindrical shape oriented perpendicular to a length of the first compression plate 804a; a spherical shape; and so on. In some cases, more than one shim can be used (e.g., layered shims, adjacent shims, and so on). As may be appreciated, the thickness of the shim 814 may vary from embodiment to embodiment.

In still further examples, supports of a load cell, such as described herein, can also be formed with one or more shims.

For example FIG. 8C depicts a load cell 800c coupled to a surface 802 that, like other embodiments described herein, includes a compressible structure 804 defined by a first compression plate 804a and a second compression plate 804b separated by a gap so as to define a volume. The first compression plate 804a includes a loading feature 806 that extends into the volume and the second compression plate 804b includes two supports, identified as the supports 808, that also extend into the volume. As with other embodiments described herein, the supports 808 define attachment points to couple to a diaphragm that includes a strain sensor.

In this embodiment, in contrast to other embodiments described herein, neither the loading feature 806 nor the supports 808 are integrally formed with the first compression plate 804a. Instead, as with the embodiment described in reference to FIG. 8B, the loading feature 806 is defined by a shim that interposes the diaphragm 810 and the first compression plate. Similarly, the supports 808 are each defined by a shim 820 that interposes the diaphragm 810 and the second compression plate 804b.

As with the embodiment described in reference to FIG. 8B, the shim 820 is adhered/coupled to both the diaphragm 810 and the second compression plate 804b via adhesive, identified in the figure as the adhesive layers 822. In other cases, the shim 820 may not be adhered to one or both of the diaphragm 810 or the first compression plate 804a. For example, in these embodiments, the shim 820 may be held in place by friction.

As with the shim 814 depicted in FIG. 8B, the shim 820 can be formed from any number of suitable materials including, but not limited to: metal; plastic (e.g., polyethylene terephthalate, nylons, acrylic, other polymer materials); glass; and so on. The shim 820 can take any number of suitable shapes including, but not limited to: a cubic shape; a linear shape having a rectangular, polygonal, triangular, or other cross-section; a cylindrical shape oriented perpendicular to a length of the first compression plate 804a; a spherical shape; and so on. In some cases, more than one shim can be used (e.g., layered shims, adjacent shims, and so on). As may be appreciated, the thickness of the shim 820 may vary from embodiment to embodiment.

The foregoing embodiments depicted in FIGS. 8A-8C and the various alternatives thereof and variations thereto are presented, generally, for purposes of explanation, and to facilitate an understanding of various implementations of a shim-based loading feature and/or a shim-based support. However, it will be apparent to one skilled in the art that some of the specific details presented herein may not be required in order to practice a particular described embodiment, or an equivalent thereof.

Thus, it is understood that the foregoing and following descriptions of specific embodiments of a load cell including a loading feature and/or a support formed from a shim, separate from a compression plate, are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

More generally, it may be appreciated that the various embodiments described above can be selectively combined in a number of suitable ways.

Figure 9A:
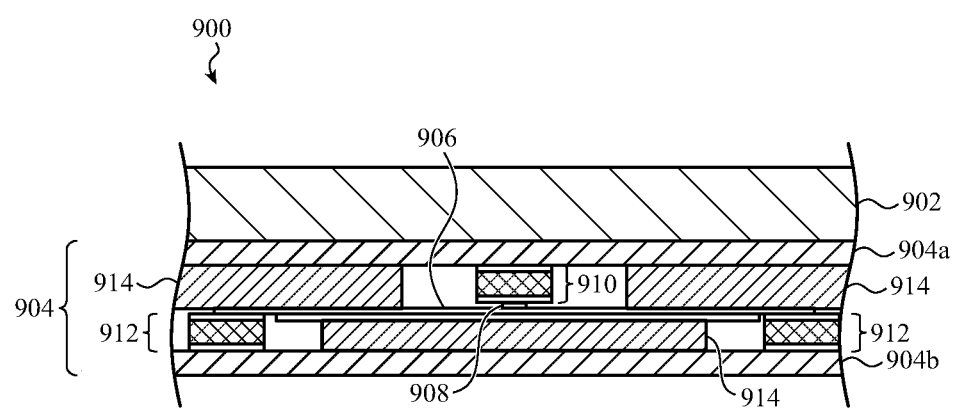
FIG. 9A depicts another example load cell, such as described herein.

For example, FIG. 9A depicts a load cell 900, coupled to a surface 902, that includes a compressible structure 904. The compressible structure 904 includes a first compression plate 904a and a second compression plate 904b that are separated by a gap to define a volume in which a diaphragm 906 is disposed. The diaphragm 906 includes a strain sensor 908 that is disposed below a shim 910 interposing the first compression plate 904a and the diaphragm 906. The shim 910 serves as a loading feature, such as described in reference to other embodiments presented herein. The diaphragm 906 is supported by two supports that are also defined by shims, identified as the shims 912, that are disposed between the second compression plate 904b and the diaphragm 906. In addition, the load cell 900 includes one or more flexible spacers and/or cushioning supports, identified as the flexible spacers 914.

As a result of the depicted construction, a load cell—such as the load cell 900—can be manufactured in a more efficient manner and at increased speed. In particular, it may be appreciated that the various functional features of the load cell 900 (e.g., the loading feature, the supports, the diaphragm, and so on) can all be deposited in a roll-to-roll process without substantive machining or manipulation. Further, it may be appreciated that more than one load cell can be manufactured in a row, such as shown in FIG. 3A. In these examples, an array of load cells can be manufactured and/or assembled together at substantially the same time. Optionally, the array of load cells can be singulated in a subsequent manufacturing process to define individual components (each including one or more load cells) suitable for installation in an electronic device enclosure.

In some examples, an array of load cells can be manufactured as—and, optionally, singulated from—a single row of load cells, such as shown in FIG. 3A. However, this is merely one example. In other cases, load cells can be manufactured in a two-dimensional array to be singulated into an appropriate one-dimensional or two-dimensional set of load cells in a later, optional, manufacturing process.

In still other examples, a strain sensor can be positioned over or relative to the supports of a load cell, such as described herein.

Figure 9B:
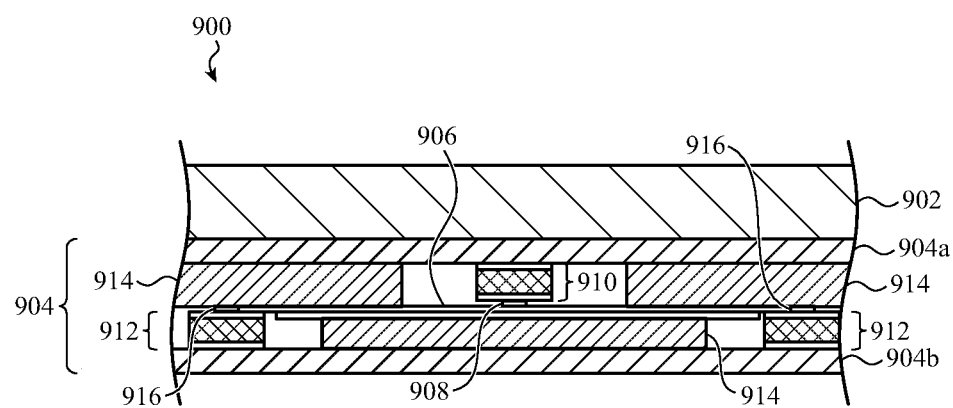
FIG. 9B depicts the load cell of FIG. 9A including multiple strain sensors.

For example, FIG. 9B—similar to the embodiment depicted in FIG. 9A—depicts a load cell 900, coupled to a surface 902, that includes a compressible structure 904 including a first compression plate 904a and a second compression plate 904b that are separated by a gap to define a volume in which a diaphragm 906, including a strain sensor 908, is disposed. The strain sensor 908 is disposed below a shim 910 interposing the first compression plate 904a and the diaphragm 906. As with the embodiment described in reference to FIG. 9A, the shim 910 serves as a loading feature, such as described in reference to other embodiments presented herein. The diaphragm 906 is supported by two supports that are also defined by shims, identified as the shims 912, that are disposed between the second compression plate and the diaphragm 906. In addition, the load cell 900 includes one or more flexible spacers and/or cushioning supports, identified as the flexible spacers 914. In this embodiment, the diaphragm 906 also includes two additional strain sensors, identified as the strain sensors 916, that are disposed relative to the shims 912 of the load cell 900.

As a result of the depicted construction, a load cell—such as the load cell 900—can be manufactured in a more efficient manner and at increased speed. In particular, it may be appreciated that the various functional features of the load cell 900 (e.g., the loading feature, the supports, the diaphragm, and so on) can all be deposited in a roll-to-roll process without substantive machining or manipulation. In addition, it may be appreciated that the load cell 900 is axially symmetric (e.g., symmetric along a length of the load cell 900). In other words, the first compression plate 904a and the second compression plate 904b can be manufactured identically (and/or as a single part to be singulated into the first and second compression plates in a later operation). Upon assembly, the second compression plate 904b is offset from the first compression plate 904a by a distance approximately equal to one half of the length of the load cell 900.

Further, as with the embodiment depicted and described in reference to FIG. 9A, it may be appreciated that more than one load cell can be manufactured in a row, such as shown in FIG. 3A. In these examples, an array of load cells can be manufactured and/or assembled together at substantially the same time. Optionally, the array of load cells can be singulated in a subsequent manufacturing process to defined individual components (each including one or more load cells) suitable for installation in an electronic device enclosure.

The foregoing embodiments depicted in FIGS. 8A-8C and the various alternatives thereof and variations thereto are presented, generally, for purposes of explanation, and to facilitate an understanding of various implementations of a load cell, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments a load cell, are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, although many preceding embodiments reference and depict a single load cell, it may be appreciated—as noted with respect to FIG. 3A—that any number of suitable load cells can be contiguously manufactured and/or coupled to one another for a particular force input sensor implementation. Furthermore, although the embodiments described herein reference rectilinear load cells for a force input sensor to be incorporated into an enclosure sidewall of an electronic device, it may be appreciated that this is merely one example. Additional examples include, but are not limited to: load cells having a curved shape to couple to a curved sidewall of an electronic device; load cells having an arbitrary shape; load cells in which one compression plate is formed integrally with a sidewall of an electronic device; load cells of different size and/or shape formed contiguously and/or coupled to one another; load cells of different size and/or shape disposed at different locations within an electronic device housing; load cells disposed on opposite sides or edges of an electronic device enclosure; and so on, and/or any combination thereof.

As such, generally and broadly, it may be appreciated that a load cell of a force input sensor, such as described herein, can be configured in a number of suitable ways that may vary from embodiment to embodiment or implementation to implementation.

Similarly, the manner by which a measurement circuit of a force input sensor, such as described herein can couple to one or more strain sensor of a load cell can vary from embodiment to embodiment. Generally and broadly, FIGS. 10A-10C depict load cell sections of an example force input sensor that can be included in an electronic device such as the electronic device 100 depicted in FIG. 1.

Figure 10A:
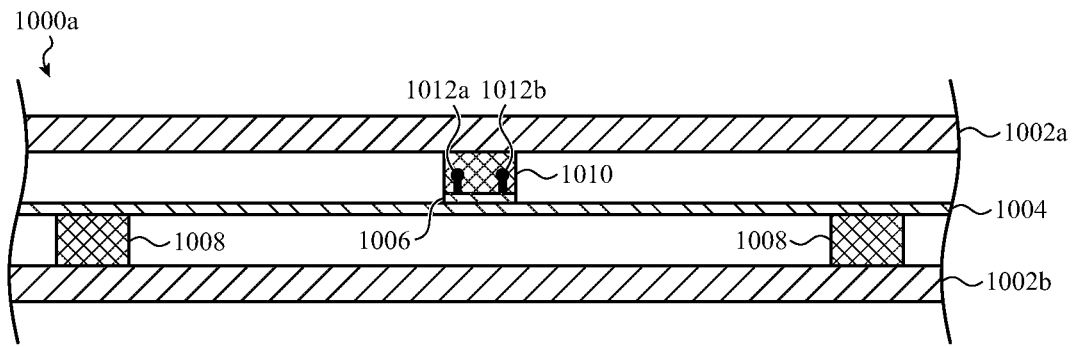
FIG. 10A depicts a load cell, such as described herein, specifically showing one example routing of strain sensor electrodes.
Figure 10B:
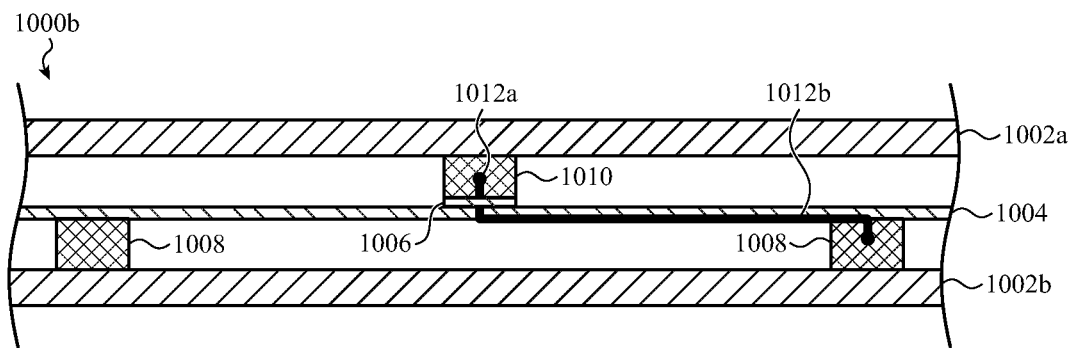
FIG. 10B depicts a load cell, such as described herein, specifically showing another example routing of strain sensor electrodes.
Figure 10C:
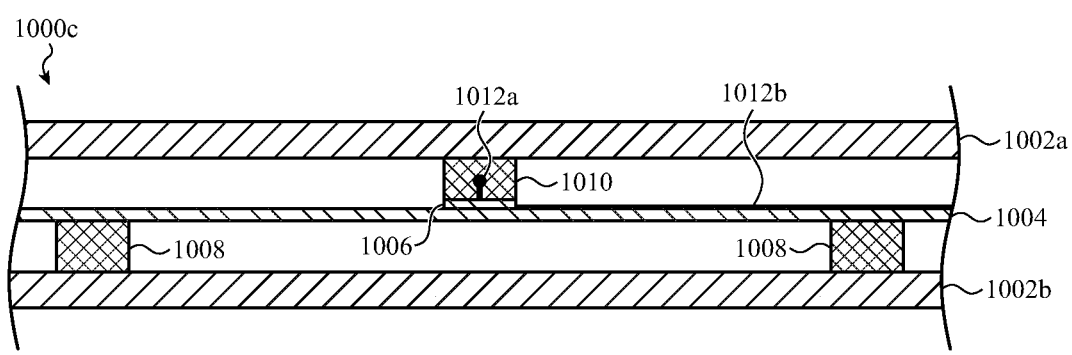
FIG. 10C depicts a load cell, such as described herein, specifically showing yet another example routing of strain sensor electrodes.

For example, FIG. 10A depicts a load cell 1000a of a force input sensors such as described herein. The load cell 1000a includes a first compression plate 1002a separated from a second compression plate 1002b by a gap. A diaphragm 1004 is disposed in the gap between the compression plates and includes a strain sensor 1006. As with other embodiments described herein, the diaphragm 1004 forms a three-point bending apparatus with two supports—identified as the supports 1008—and a loading feature 1010. As a result of this construction, when a force is applied to one or both of the first compression plate 1002a or the second compression plate 1002b, the loading feature 1010 induces a bending moment in the diaphragm 1004, causing the strain sensor 1006 to experience strain.

As noted with respect to other embodiments described herein, strain experienced by the strain sensor 1006 can be measured in a number of suitable ways by a number of suitable circuits, processors, or combinations thereof. For simplicity of description, the embodiments that follow reference an implementation in which a load cell—such as the load cell 1000a—includes only a single, two-lead strain sensor that exhibits a change in resistance in response to strain. It may be appreciated, however, that this is merely one example and that other load cells can include multiple addressable and/or networked strain sensors that may include multiple leads and/or other connections to interface with a measurement circuit, such as described herein.

Continuing the example embodiment introduced above, a measurement circuit (not shown) can be electrically coupled to the strain sensor 1006, and can be configured to measure the resistance of the strain sensor 1006 using any suitable technique. For simplicity of description, a measurement circuit is omitted from FIG. 10A. In the illustrated example, the two leads of the strain sensor 1006, identified as the leads 1012a, 1012b are depicted as vias and/or electrical traces defined within the loading feature 1010.

In another embodiment, shown in FIG. 10B, a load cell 900b (configured and labeled in the same manner as the load cell 900a of FIG. 10A), can include two leads, identified as the leads 1012a, 1012b. In this example, a first lead 1012a is depicted as a via and/or an electrical trace defined within the loading feature 1010. A second lead 1012b is depicted as a via and/or an electrical trace defined on a surface of the diaphragm 1004 and one of the supports 1008.

In yet another embodiment, shown in FIG. 10C, a load cell 900c (configured and labeled in the same manner as the load cell 900a of FIG. 10A), can include two leads, identified as the leads 1012a, 1012b. In this example, a first lead 1012a is depicted as a via and/or an electrical trace defined within the loading feature 1010. A second lead 1012b is depicted as a via and/or an electrical trace defined on a surface of the diaphragm 1004.

The foregoing embodiments depicted in FIGS. 10A-10C and the various alternatives thereof and variations thereto are presented, generally, for purposes of explanation, and to facilitate an understanding of various techniques for electrically coupling a strain sensor of a load cell to an electrical circuit. However, it will be apparent to one skilled in the art that some of the specific details presented herein may not be required in order to practice a particular described embodiment, or an equivalent thereof.

Figure 11:
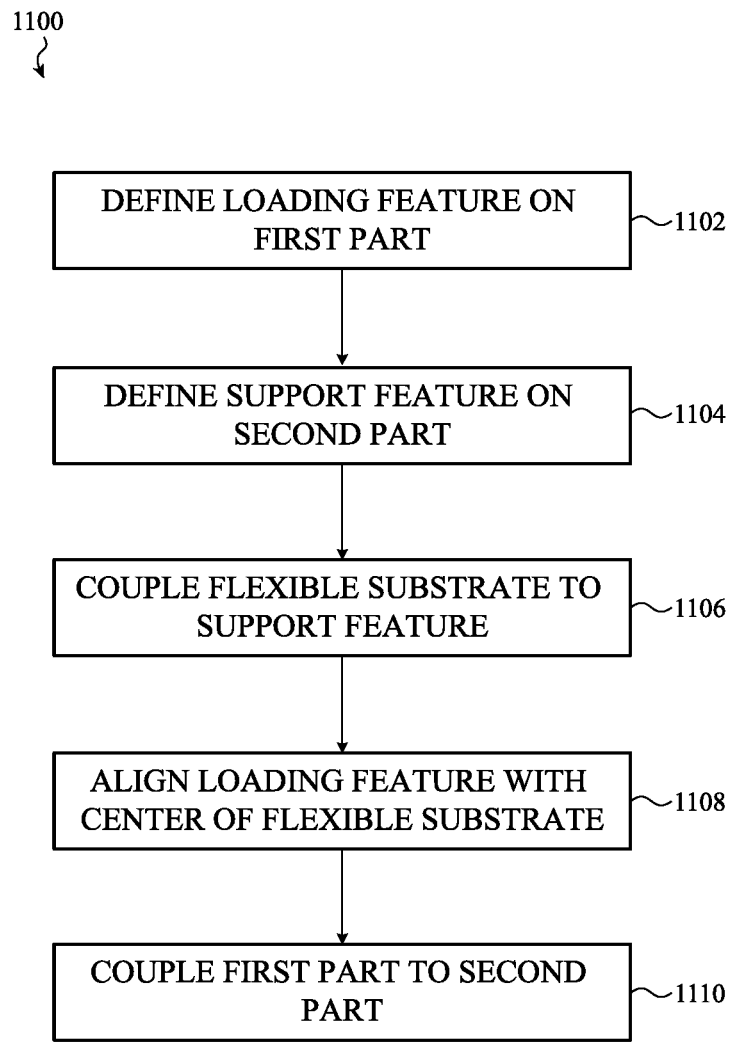
FIG. 11 is a simplified flow chart showing example operations of a method of manufacturing a load cell, such as described herein.
Figure 12:
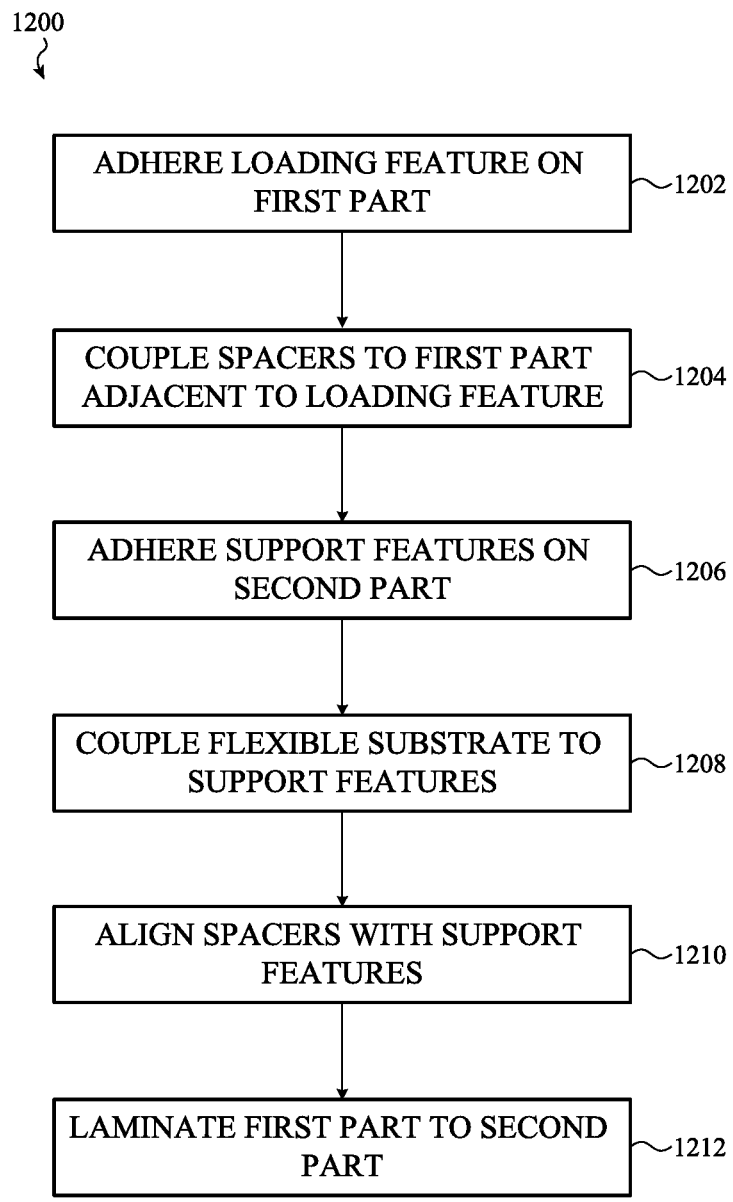
FIG. 12 is a simplified flow chart showing example operations of another method of manufacturing a load cell, such as described herein.
Figure 13:
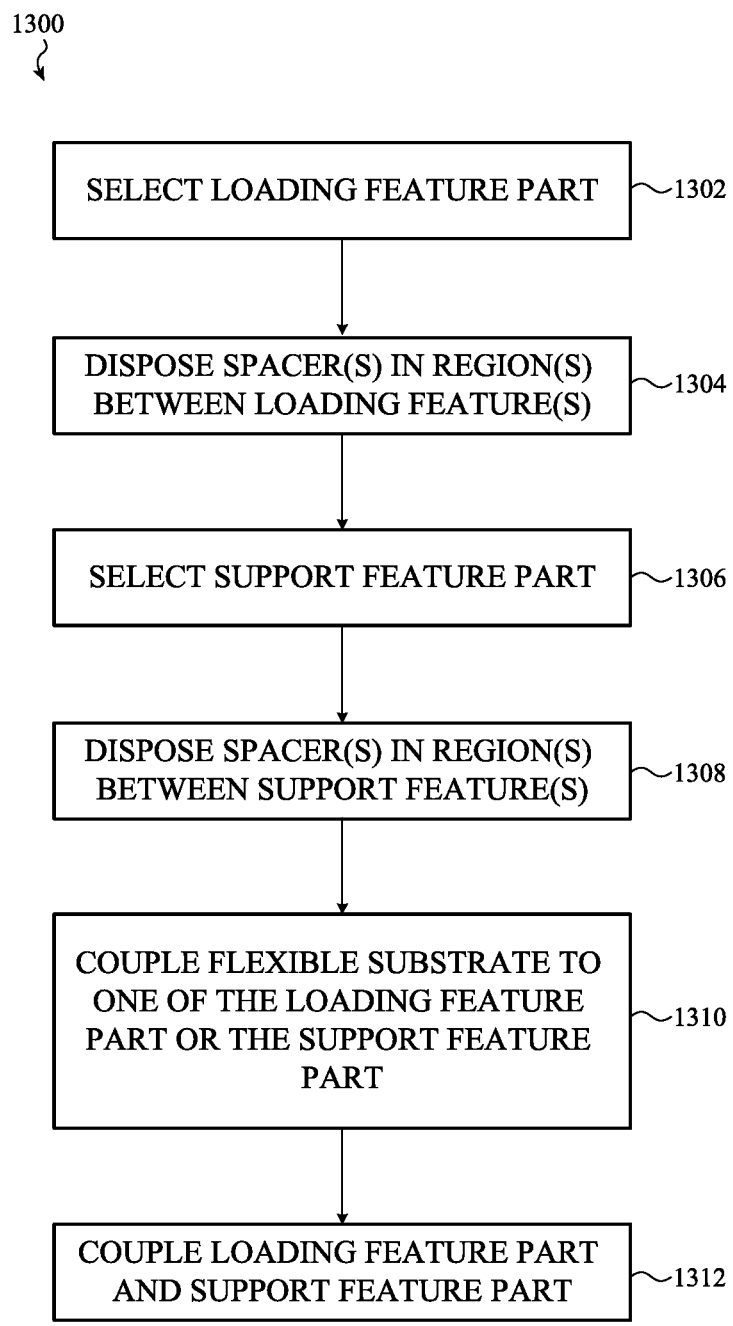
FIG. 13 is a simplified flow chart showing example operations of another method of manufacturing a load cell, such as described herein.

Generally and broadly, FIGS. 11-13 depict simplified flow charts of example operations of methods of manufacturing a load cell and/or a load cell array for a force input sensor for an electronic device enclosure, such as described herein. It may be appreciated, however, that these simplified examples are not exhaustive and other methods of manufacturing, assembly, and construction may be used in other embodiments.

FIG. 11 is a simplified flow chart showing example operations of a method of manufacturing a load cell, such as described herein. The method 1100 includes operation 1102 in which a loading feature is defined and/or formed on a first compression plate, typically referred to herein as a compression plate. The method 1100 also includes operation 1104 in which a support feature is defined and/or formed onto a second compression plate, again, typically referred to herein as a compression plate. As noted with respect to other embodiments described herein, a loading feature and/or a support feature can be formed in a number of suitable ways including by, without limitation: machining a compression plate; ablating a compression plate; stamping a compression plate; and so on.

The method 1100 also includes operation 1106 in which a flexible substrate (also referred to herein as a "diaphragm") onto the supports of the second compression plate. At operation 1108, the loading feature of the first compression plate is aligned with a central region of the flexible substrate and, at operation 1110, the first compression plate is coupled to the second compression plate.

FIG. 12 is a simplified flow chart showing example operations of a method of manufacturing a load cell, such as described herein. Similar to the method 1100 depicted in FIG. 11, the method 1200 includes operation 1202 in which a loading feature is adhered onto and/or coupled to a first compression plate (also referred to as a "compression plate").

The method 1200 also includes operation 1204 in which a flexible spacer and/or a cushioning spacer is coupled to the first compression plate, adjacent to the loading feature.

The method 1200 also includes operation 1206 in which a support feature is adhered to or otherwise coupled to a second compression plate, again, typically referred to as a compression plate. As noted with respect to other embodiments described herein, a loading feature and/or a support feature can be coupled to the first or second compression plate in a number of suitable ways including by, without limitation: adhesive; welding; heat-staking; and so on.

The method 1200 also includes operation 1208 in which a flexible substrate (also referred to herein as a "diaphragm") onto the supports of the second compression plate. At operation 1210, the loading feature of the first compression plate is aligned with a central region of the flexible substrate and, at operation 1212, the first compression plate is laminated to the second compression plate.

FIG. 13 is a simplified flow chart showing example operations of another method of manufacturing a load cell, such as described herein. The method 1300 includes operation 1302 in which a loading feature part is selected. In these embodiments, a loading feature part is understood to be a compression plate—such as described herein—having multiple loading features formed and/or coupled thereon. The method 1300 also includes operation 1304 in which a set of flexible spacers are disposed onto the loading feature part, between the loading features. In this manner, the flexible spacers partition the loading feature part. The method 1300 includes operation 1306 in which a support feature part is selected. In these embodiments, a support feature part is understood to be a compression plate—such as described herein—having multiple support features formed and/or coupled thereon. The method 1300 also includes operation 1308 in which a set of flexible spacers are disposed onto the support feature part, between the support features. In this manner, the flexible spacers partition the support feature part. The method 1300 also includes operation 1310 in which a flexible substrate (also referred to herein as a "diaphragm") over the support features of the support feature part. Finally, at operation 1312, the support feature part is coupled to the loading feature part.

The foregoing embodiments depicted in FIGS. 11-13 and the various alternatives thereof and variations thereto are presented, generally, for purposes of explanation, and to facilitate an understanding of various configurations of a load cell array the various components thereof, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments of a method of manufacturing a load cell or load cell array are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Further, one may appreciate that although many embodiments are disclosed above, that the operations and steps presented with respect to methods and techniques described herein are meant as exemplary and accordingly are not exhaustive. One may further appreciate that alternate step order or, fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but are instead defined by the claims herein presented.

What is claimed is:

1. An electronic device comprising:
   an enclosure comprising:
      an interior sidewall surface; and
      an exterior sidewall surface opposite the interior sidewall surface and configured to receive a force input from a user of the electronic device; and
   a force input sensor coupled to the interior sidewall surface and comprising:
      a first compression plate coupled to the interior sidewall surface;
      a second compression plate separated from the first compression plate so as to define a volume between the first compression plate and the second compression plate;
      a pair of supports extending into the volume from opposite ends of the first compression plate;
      a strain concentrator having a curved profile comprising a maxima extending into the volume from the second compression plate;
      a flexible substrate disposed within the volume between the first compression plate and the second compression plate, the flexible substrate comprising:
         a first side coupled to the pair of supports; and
         a second side in contact with the maxima of the curved profile of the strain concentor;
      a first strain sensor disposed on the first side of the flexible substrate opposite the maxima of the curved profile of the strain concentor; and
      a second strain sensor disposed on the second side of the flexible substrate between the maxima of the curved profile of the strain concentor and one of the pair of supports; wherein:
      the force input sensor permits the first compression plate to move toward the second compression plate in response to the force input applied normal to the exterior sidewall surface; and
      the strain concentrator induces a bending moment in the flexible substrate, tensing the first strain sensor and compressing the second strain sensor, in response to the first compression plate moving toward the second compression plate.

2. The electronic device of claim 1, further comprising a flexible spacer disposed between the first compression plate and the second compression plate, the flexible spacer configured to deform in response to the force input thereby permitting the first compression plate to move toward the second compression plate.

3. The electronic device of claim 1, wherein the strain concentrator is formed integrally with the second compression plate.

4. The electronic device of claim 1, wherein the pair of supports are formed integrally with the first compression plate.

5. The electronic device of claim 1, wherein the strain concentrator comprises a shim coupled to the second compression plate.

6. The electronic device of claim 1, wherein the strain concentrator comprises a cured adhesive.

7. The electronic device of claim 1, wherein at least one support of the pair of supports comprises a shim coupled to the first compression plate.

8. The electronic device of claim 1, further comprising a stiffener coupled to the first side of the flexible substrate.

9. The electronic device of claim 8, wherein the stiffener comprises a cutout aligned with the first strain sensor.

10. An electronic device enclosure configured to receive a force input, the electronic device enclosure comprising:
    an exterior surface configured to receive the force input;
    an interior surface opposite the exterior surface;
    a loading feature having a curved profile defining a maxima extending from the interior surface;
    a structure separated from the interior surface and defining a support offset from the loading feature;
    a flexible substrate contacting the maxima of the loading feature and coupled to the support;
    a first strain sensor disposed on the flexible substrate opposite with the loading feature; and
    a second strain sensor disposed on the flexible substrate between the loading feature and the support; wherein:

the interior surface moves in response to the force input, thereby causing the loading feature to induce a bending moment in the flexible substrate and induce a tension in the first strain sensor and a compression in the second strain sensor.

11. The electronic device enclosure of claim 10, comprising a frame defining the interior surface and the exterior surface.

12. The electronic device enclosure of claim 11, wherein the frame is formed from stainless steel.

13. The electronic device enclosure of claim 11, wherein the frame defines an exterior sidewall surface of the enclosure.

14. The electronic device enclosure of claim 10, wherein the first strain sensor is disposed on the flexible substrate offset from the loading feature.

15. The electronic device enclosure of claim 10, further comprising a foam spacer disposed between the interior surface and the structure.

16. The electronic device enclosure of claim 10, further comprising a foam spacer disposed between the structure and the flexible substrate.

\* \* \* \* \*